United States Patent
Dejneka et al.

(10) Patent No.: US 11,401,210 B2
(45) Date of Patent: Aug. 2, 2022

(54) PRE-FRACTURED GLASS COMPOSITES AND LAMINATES WITH IMPACT RESISTANCE AND METHODS OF MAKING THE SAME

(71) Applicant: CORNING INCORPORATED, Corning, NY (US)

(72) Inventors: Matthew John Dejneka, Corning, NY (US); Zhongzhi Tang, San Jose, CA (US)

(73) Assignee: Corning Incorporated, Corning, NY (US)

(*) Notice: Subject to any disclaimer, the term of this patent is extended or adjusted under 35 U.S.C. 154(b) by 650 days.

(21) Appl. No.: 16/154,017

(22) Filed: Oct. 8, 2018

(65) Prior Publication Data
US 2019/0106357 A1   Apr. 11, 2019

Related U.S. Application Data

(60) Provisional application No. 62/568,904, filed on Oct. 6, 2017.

(51) Int. Cl.
*C03C 27/06* (2006.01)
*C03C 11/00* (2006.01)
(Continued)

(52) U.S. Cl.
CPC ............... *C03C 27/06* (2013.01); *B32B 3/10* (2013.01); *B32B 17/1055* (2013.01);
(Continued)

(58) Field of Classification Search
CPC . B32B 3/10–22; B32B 17/1055; B32B 37/02; B32B 37/144; B32B 2307/418;
(Continued)

(56) References Cited

U.S. PATENT DOCUMENTS 3,357,876 A * 12/1967 Rinehart ............... C03C 21/002
428/410
4,711,544 A * 12/1987 Iino ......................... G02B 27/01
353/14

(Continued)

FOREIGN PATENT DOCUMENTS

CA         2101467 A1    1/1994
CA         2670784 A1    6/2010
(Continued)

OTHER PUBLICATIONS

International Search Report and Written Opinion of the European International Searching Authority; PCT/US2018054680; dated Dec. 3, 2019; 13 Pgs.

(Continued)

*Primary Examiner* — Maria V Ewald
*Assistant Examiner* — Ethan Weydemeyer
(74) *Attorney, Agent, or Firm* — Payal A. Patel; Jeffrey A. Schmidt

(57) ABSTRACT

A pre-fractured glass laminate that includes: a glass substrate comprising a thickness, a pair of opposed primary surfaces, a compressive stress region, a central tension (CT) region and a plurality of cracks; a second phase comprising a polymer or a cured resin within the plurality of cracks; a backing layer; and an interlayer disposed between one of the primary surfaces of the substrate and the backing layer. The compressive stress region extends from each of the primary surfaces to a first selected depth in the substrate. Further, the plurality of cracks is located in the CT region.

30 Claims, 10 Drawing Sheets

(51) Int. Cl.
  *B32B 3/10* (2006.01)
  *B32B 17/10* (2006.01)
  *B32B 37/02* (2006.01)
  *B32B 37/14* (2006.01)
  *C03C 27/10* (2006.01)
  *C03C 21/00* (2006.01)

(52) U.S. Cl.
  CPC ............ *B32B 37/02* (2013.01); *B32B 37/144* (2013.01); *C03C 11/00* (2013.01); *C03C 27/10* (2013.01); *B32B 2307/418* (2013.01); *B32B 2307/558* (2013.01); *B32B 2315/08* (2013.01); *B32B 2457/20* (2013.01); *B32B 2605/006* (2013.01); *C03C 21/002* (2013.01); *C03C 2201/60* (2013.01)

(58) Field of Classification Search
  CPC .......... B32B 2307/558; B32B 2315/08; B32B 4257/20; B32B 2605/006; C03C 27/06–10; C03C 11/00–007; C03C 21/002; C03C 2201/60
  See application file for complete search history.

(56) References Cited

U.S. PATENT DOCUMENTS

| | | | |
|---|---|---|---|
| 5,277,952 A | 1/1994 | Watras | |
| 5,447,760 A | 9/1995 | Watras | |
| 6,120,907 A | 9/2000 | Tahon et al. | |
| 6,385,999 B1 | 5/2002 | Silas | |
| 6,432,522 B1 * | 8/2002 | Friedman | B32B 17/10036 428/212 |
| 6,482,488 B1 | 11/2002 | Janssen et al. | |
| 9,272,945 B2 | 3/2016 | Smith | |
| 9,801,297 B2 | 10/2017 | Amin et al. | |
| 10,329,194 B2 | 6/2019 | Barthelat et al. | |
| 2004/0132867 A1 * | 7/2004 | Shibahara | C08K 3/40 523/466 |
| 2006/0207715 A1 | 9/2006 | Barban | |
| 2008/0163648 A1 * | 7/2008 | Sundholm | C03C 17/28 65/17.2 |
| 2015/0146074 A1 * | 5/2015 | Takei | G02B 1/118 348/340 |
| 2015/0274587 A1 | 10/2015 | Barthelat et al. | |
| 2016/0102014 A1 | 4/2016 | Hu et al. | |
| 2017/0022092 A1 | 1/2017 | Demartino et al. | |
| 2017/0197873 A1 | 7/2017 | Barthelat et al. | |
| 2017/0305787 A1 | 10/2017 | Gomez et al. | |

FOREIGN PATENT DOCUMENTS

| | | |
|---|---|---|
| CN | 1309606 A | 8/2001 |
| CN | 102092961 A | 6/2011 |
| CN | 209652172 U | 11/2019 |
| EP | 0982121 A1 | 3/2000 |
| EP | 1702749 A1 | 9/2006 |
| JP | 2017-132654 A | 8/2017 |
| TW | 201728446 A | 8/2017 |
| WO | 00/24575 A1 | 5/2000 |
| WO | 2018112181 A1 | 6/2018 |

OTHER PUBLICATIONS

Mirkhalaf et al. "Overcoming the brittleness of glass through bio-inspiration and micro-architechture", Nature Communications 5:3166, Jan. 28, 2014. 9 pgs.
Datsiou, "Bioinspired improvement of laminated glass", Science 364(6447) Jun. 28, 2019, pp. 1232-1233.
Yin et al. "Impact-resistant nacre-like transparent materials", Science 364(6447) Jun. 28, 2019, pp. 1260-1263.
"Corning Leads $62M Investment in 'Smart' Glass Maker View", Optics.org, Jun. 19, 2013 http://optics.org/news/4/6/27).
Glover et al.; "The Interactive Whiteboard: a Literature Survey". Technolgoy, Pedagogy and Education (14) 2: 155-170 (2005).
Gorilla Glass—Full Products List, http://www.corninggorillaglass.com/products-with-gorilla/full-products-list.
List of Devices With Gorilla Glass, Wikipedia; http://en.wikipedia.org/wiki/List_of_devices_with_Gorilla_Glass.
English Translation of TW107134907 Office Action dated Mar. 24, 2020; 3 Pages; Taiwan Patent Office.
Japanese Patent Application No. 2020-519762, Office Action dated Jun. 28, 2021, 9 pages (4 pages of English Translation and 5 pages of Original Document), Japanese Patent Office.
Chinese Patent Application No. 201880065234.0, Office Action dated Jun. 3, 2021; 9 pages (English Translation only); Chinese Patent Office.

* cited by examiner

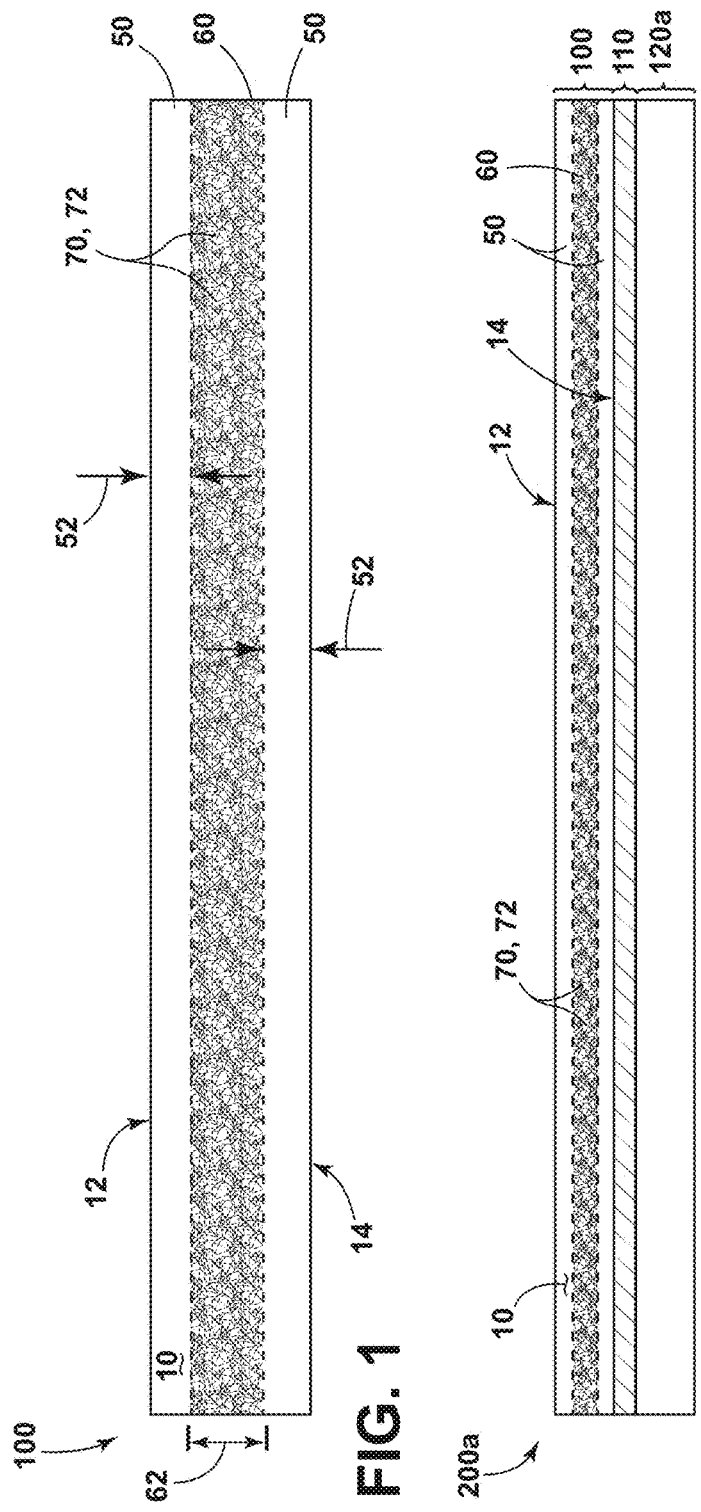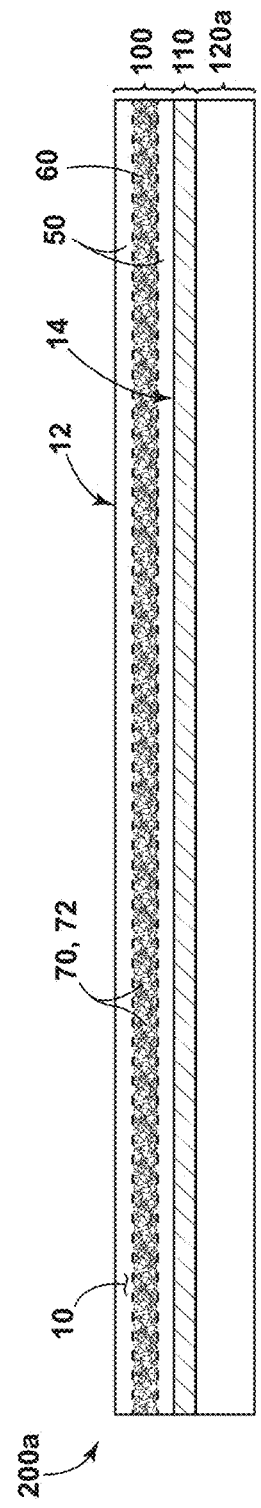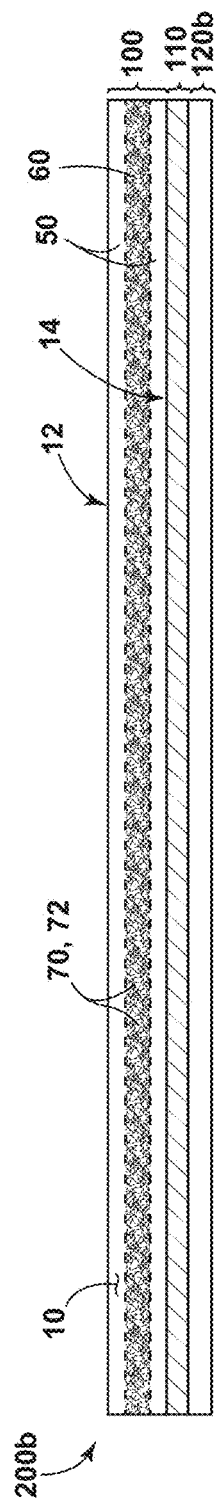

PRE-FRACTURED GLASS COMPOSITES AND LAMINATES WITH IMPACT RESISTANCE AND METHODS OF MAKING THE SAME

CROSS-REFERENCE TO RELATED APPLICATION

This application claims the benefit of priority under 35 U.S.C. § 119 of U.S. Provisional Application Ser. No. 62/568,904 filed on Oct. 6, 2017, the content of which is relied upon and incorporated herein by reference in its entirety.

FIELD

The present disclosure generally relates to glass materials, particularly pre-fractured glass composites and laminates, with impact resistance, and methods of making the same.

BACKGROUND

Glass materials, many of which are configured or otherwise processed with various strength-enhancing features, are prevalent in various displays and display devices of many consumer electronic products. For example, chemically strengthened glass is favored for many touch-screen products, including cell phones, music players, e-book readers, notepads, tablets, laptop computers, automatic teller machines, and other similar devices. Many of these glass materials are also employed in displays and display devices of consumer electronic products that do not have touch-screen capability, but are prone to mechanical contact, including desktop computers, laptop computers, elevator screens, equipment displays, and others.

Glass materials, as processed in some cases with strength-enhancing features, are also prevalent in various applications requiring display- and/or optic-related functionality and demanding mechanical property considerations. For example, these materials can be employed as cover lenses, substrates and housings for watches, smartphones, retail scanners, eyeglasses, eyeglass-based displays, outdoor displays, automotive displays and other related applications. These materials can also be employed in vehicular windshields, vehicular windows, vehicular moon-roof, sun-roof and panoramic roof elements, architectural glass, residential and commercial windows, and other similar applications.

As used in these display and related applications, these glass materials are often configured with coatings to enhance wear resistance and resist the development of mechanically-induced defects that can otherwise lead to premature failure. Many of these glass materials are also subjected to strengthening processes (e.g., tempering, ion exchange, etc.) that result in a compressive stress layer. In these strengthened glass materials, the compressive stress region serves to increase the strength of the glass material and resist crack propagation.

While these glass materials may exhibit increased strength and wear resistance as a result of these processes and/or coatings, many of them will still be susceptible to low damage resistance. For example, cracks that propagate through a compressive stress region in a strengthened glass material will likely encounter a region within the material with residual tensile stresses. Upon reaching a region with residual tensile stress, the cracks can quickly propagate leading to partial or ultimate failure of the glass materials. Further, these cracks can bifurcate into multiple cracks that, in some cases, can produce a dangerous failure mechanism manifested by sharp glass fragments. In addition, the thickness of the compressive stress region in the glass material is typically limited to about 20 to 25% of the overall thickness of the glass material (i.e., when formed by an ion exchange process), and approaching these limits can lead to high processing and manufacturing costs. Further, in view of these compressive stress region thickness limitations, the flaws and defects within the glass materials may need to be controlled (e.g., through glass forming processes, polishing, etc.) to a smaller size than the size of the compressive stress region to ensure that they do not precipitate cracks that propagate into a region of residual tensile stress.

In view of these considerations, there is a need for glass materials, including pre-fractured glass composites and laminates, with impact resistance, and methods of making the same.

SUMMARY

An aspect of this disclosure pertains to a pre-fractured glass composite that includes: a glass substrate comprising a thickness, a pair of opposed primary surfaces, a compressive stress region, a central tension (CT) region and a plurality of cracks; and a second phase comprising a polymer or a cured resin within the plurality of cracks. The compressive stress region extends from each of the primary surfaces to a first selected depth in the substrate. Further, the plurality of cracks is located in the CT region.

A further aspect of this disclosure pertains to a pre-fractured glass laminate that includes: a glass substrate comprising a thickness, a pair of opposed primary surfaces, a compressive stress region, a central tension (CT) region and a plurality of cracks; a second phase comprising a polymer or a cured resin within the plurality of cracks; a backing layer; and an interlayer disposed between one of the primary surfaces of the substrate and the backing layer. The compressive stress region extends from each of the primary surfaces to a first selected depth in the substrate. Further, the plurality of cracks is located in the CT region.

An additional aspect of this disclosure pertains to a pre-fractured glass laminate that includes: a first glass substrate comprising a thickness, a pair of opposed primary surfaces, a compressive stress region, a central tension (CT) region and a plurality of cracks; a second glass substrate comprising a thickness, a pair of opposed primary surfaces, a compressive stress region, a central tension (CT) region and a plurality of cracks; a second phase comprising a polymer or a cured resin within the plurality of cracks; and an interlayer disposed between the first and second glass substrates. The compressive stress region extends from each of the primary surfaces to a first selected depth in the substrate. Further, the plurality of cracks is located in the CT region.

In embodiments of the foregoing laminates and composites, a substantial portion of the plurality of cracks is devoid of air pockets. In some embodiments, the plurality of cracks further comprises an average fragment size that is less than 5× the thickness of the glass substrate or, in some cases, less than 1.5× the thickness of the glass substrate. According to some implementations, the plurality of cracks defines a plurality of fragments, and the plurality of fragments comprises an average aspect ratio of 20 or less, 10 or less, 4 or less or, in some cases, an average aspect ratio of 2 or less.

In embodiments of the foregoing laminates and composites, the polymer or the cured resin is characterized by a refractive index within 10% of a refractive index of the glass substrate.

In an additional implementation of these aspects, a consumer electronic product is provided that includes: a housing that includes a front surface, a back surface and side surfaces; electrical components that are at least partially inside the housing; and a display at or adjacent to the front surface of the housing. Further, one of the foregoing pre-fractured glass composites or laminates is at least one of disposed over the display and disposed as a portion of the housing.

According to some embodiments of the foregoing laminates and composites, the composite or laminate is characterized by an average impact speed of 400 mm/s prior to failure in a 110 Degree Diamond Dynamic Impact Test.

In embodiments of the foregoing laminates and composites, the compressive stress region and the first selected depth are defined by an ion exchange or a thermal tempering process.

According to some embodiments of the foregoing composites, the interlayer can include a material having the same composition as that of the polymer or the cured resin. In other embodiments of these composites, the backing layer can be characterized by an elastic modulus that is at least 25% greater than an elastic modulus of the interlayer. Further, the backing layer can include a polymer, a glass, a glass-ceramic or a ceramic material.

In a further implementation of these aspects, a vehicle display system is provided that includes: a housing that includes a front surface, a back surface and side surfaces; electrical components that are at least partially inside the housing; and a display at or adjacent to the front surface of the housing. Further, one of the foregoing pre-fractured glass composites or laminates is at least one of disposed over the display and disposed as a portion of the housing.

In an additional implementation of these aspects, a window panel for a vehicle is provided that includes: a frame coupled to the vehicle; and a laminate positioned within the frame. The laminate includes a first, second and third glass substrate, each substrate comprising a thickness, a pair of opposed primary surfaces, a compressive stress region, a central tension (CT) region and a plurality of cracks; a second phase comprising a polymer or a cured resin within the plurality of cracks in the first, second and third glass substrates; a first interlayer disposed between the first and second glass substrates; and a second interlayer disposed between the second and third glass substrates. Further, the compressive stress region extends from each of the primary surfaces to a first selected depth in the substrate. In addition, the plurality of cracks is located in the CT region of each of the substrates.

According to another aspect, a method of making a pre-fractured glass laminate is provided that includes: laminating a glass substrate to a backing layer with an interlayer disposed between the substrate and the backing layer, the glass substrate comprising a thickness, a pair of opposed primary surfaces, a compressive stress region and a central tension (CT) region; immersing the laminated substrate, backing layer and interlayer into a bath of a curable resin or a polymer; generating a plurality of cracks within the CT region of the glass substrate; infiltrating the curable resin or the polymer into the plurality of cracks within the CT region of the glass substrate; and curing the curable resin or the polymer within the plurality of cracks to form a pre-fractured glass laminate.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which:

FIG. 1 is a cross-sectional, schematic view of a pre-fractured glass composite comprising a glass substrate with a plurality of cracks and a second phase comprising a polymer or a cured resin within the plurality of cracks, according to an aspect of the disclosure.

FIG. 2A is a cross-sectional, schematic view of a pre-fractured glass laminate comprising a glass substrate with a plurality of cracks, a second phase comprising a polymer or a cured resin within the plurality of cracks, a backing layer and an interlayer between the substrate and the backing layer, according to a further aspect of the disclosure.

FIG. 2B is a cross-sectional, schematic view of a pre-fractured glass laminate comprising a glass substrate with a plurality of cracks, a second phase comprising a polymer or a cured resin within the plurality of cracks, a backing layer and an interlayer between the substrate and the backing layer, according to another aspect of the disclosure.

DETAILED DESCRIPTION

Figure 3:
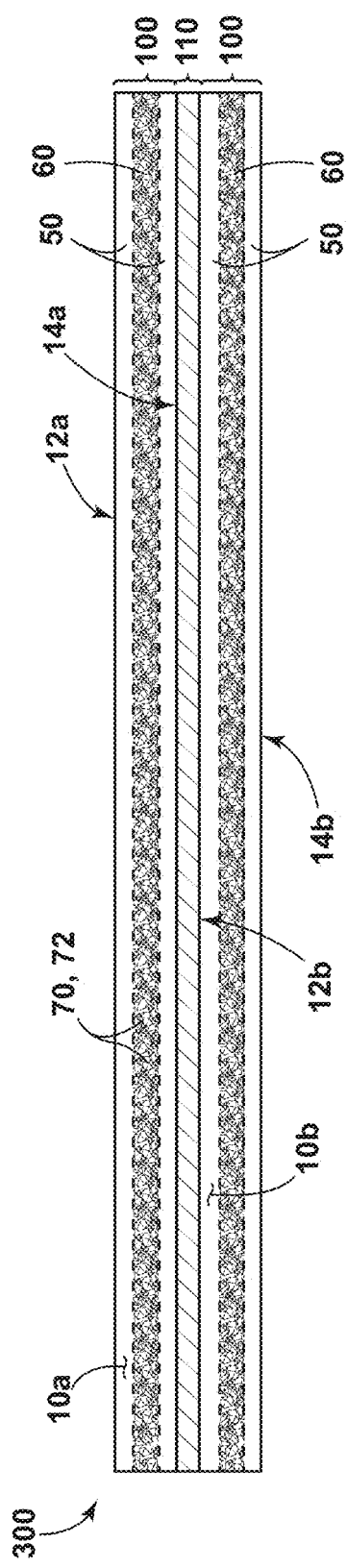
FIG. 3 is a cross-sectional, schematic view of a pre-fractured glass laminate comprising a first glass substrate with a plurality of cracks, a second glass substrate with a plurality of cracks, a second phase comprising a polymer or a cured resin within the plurality of cracks in the first and second substrates, and an interlayer between the substrates, according to an aspect of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

As used herein the term "pre-fractured" means that the glass has been subject to an intentional event that causes fracture in the substrate, and such fracture has been imparted to the glass prior to infiltration of resin into the cracks caused by the intentional event, e.g., the substrate has been imparted with engineered cracks. In other words, the fracture event has been caused prior to the glass being used for its intended purpose in an electronic or other device, as opposed to fracture caused after the glass has been installed as intended in a device and fracture caused by an event during use of the device.

Aspects of the disclosure generally pertain to pre-fractured glass composites and laminates that include glass substrates with a compressive stress region, a central tension region and a plurality of cracks; and a second phase comprising a resin within the plurality of cracks. Pre-fractured glass laminates can also include a backing layer and an interlayer disposed between the substrate and the backing layer. More generally, these pre-fractured composites and laminates are characterized by impact resistance, in addition to other optical and mechanical properties (e.g., strength, transmissivity, etc.). Further, these pre-fractured composites and laminates include pre-fractured glass substrates that are configured to arrest any cracks that form within them from the application of stress. Further, these composites and laminates are configured to yield non-sharp glass fragments upon breakage (e.g., as they are already in a controlled, pre-fractured state, i.e., the glass has been fractured prior to use in its intended application), which provides added safety to living beings that come into contact with the resulting fragments. In addition, these pre-fractured laminates and composites retain the optical properties of bare glass substrates as their 'engineered' cracks are filled with an indexmatching resin. Finally, the disclosure outlines methods for making these composites and laminates, including a step of immersing a glass substrate (i.e., as configured with a compressive stress region and central tension region) in a resin, introducing a plurality of cracks into the substrate, allowing the resin to infiltrate the cracks for a period of time, and then curing the resin within the cracks.

Referring to FIG. 1, a pre-fractured glass composite 100 is depicted that includes a substrate 10 comprising a glass composition. That is, the substrate 10 may include one or more glass materials therein. The substrate 10 also comprises a pair of opposing primary surfaces 12, 14. The substrate 10 further includes a compressive stress region 50, a central tension (CT) region 60 and a plurality of cracks 72. In embodiments, the plurality of cracks 72 is located within the CT region 60, which spans a thickness 62. As also shown in FIG. 1, the composite 100 further includes a second phase 70 that comprises a polymer or a cured resin within the plurality of cracks 72.

In some embodiments of the pre-fractured glass composite 100, as depicted in FIG. 1, the glass substrate 10 comprises a selected length and width, or diameter, to define its surface area. The substrate 10 may have at least one edge between the primary surfaces 12, 14 of the substrate 10 defined by its length and width, or diameter.

The glass substrate 10 may include an amorphous substrate, a crystalline substrate or a combination thereof (e.g., a glass-ceramic substrate). The glass substrate 10 may include a soda lime glass, an alkali aluminosilicate glass, alkali containing borosilicate glass, alkali aluminophosphosilicate glass or alkali aluminoborosilicate glass. In one or more embodiments, the glass substrate 10 (prior to being chemically strengthened as described herein) may include a glass having a composition, in mole percent (mole %), including: SiO2 in the range from about 40 to about 80, $Al_2O_3$ in the range from about 10 to about 30, $B_2O_3$ in the range from about 0 to about 10, $R_2O$ in the range from about 0 to about 20, and RO in the range from about 0 to about 15. In some instances, the composition may include either one or both of $ZrO_2$ in the range from about 0 mol % to about 5 mol % and $P_2O_5$ in the range from about 0 to about 15 mol %. $TiO_2$ can be present from about 0 mol % to about 2 mol %.

In some embodiments, the composition of the glass substrate 10 may include $SiO_2$ in an amount, in mol %, in the range from about 45 to about 80, from about 45 to about 75, from about 45 to about 70, from about 45 to about 65, from about 45 to about 60, from about 45 to about 65, from about 45 to about 65, from about 50 to about 70, from about 55 to about 70, from about 60 to about 70, from about 70 to about 75, or from about 50 to about 65.

In some embodiments, the composition of the glass substrate 10 may include $Al_2O_3$ in an amount, in mol %, in the range from about 5 to about 28, from about 5 to about 26, from about 5 to about 25, from about 5 to about 24, from about 5 to about 22, from about 5 to about 20, from about 6 to about 30, from about 8 to about 30, from about 10 to about 30, from about 12 to about 30, from about 14 to about 30, from about 16 to about 30, from about 18 to about 30, or from about 18 to about 28.

In one or more embodiments, the composition of the glass substrate 10 may include $B_2O_3$ in an amount, in mol %, in the range from about 0 to about 8, from about 0 to about 6, from about 0 to about 4, from about 0.1 to about 8, from about 0.1 to about 6, from about 0.1 to about 4, from about 1 to about 10, from about 2 to about 10, from about 4 to about 10, from about 2 to about 8, from about 0.1 to about 5, or from about 1 to about 3. In some instances, the glass composition may be substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In some embodiments, the composition of the glass substrate 10 may include one or more alkali earth metal oxides, such as MgO, CaO and ZnO. In some embodiments, the total amount of the one or more alkali earth metal oxides may be a non-zero amount up to about 15 mol %. In one or more specific embodiments, the total amount of any of the alkali earth metal oxides may be a non-zero amount up to about 14 mol %, up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkali earth metal oxides may be in the range from about 0.1 to 10, from about 0.1 to 8, from about 0.1 to 6, from about 0.1 to 5, from about 1 to 10, from about 2 to 10, or from about 2.5 to 8. The amount of MgO may be in the range from about 0 mol % to about 5 mol % (e.g., from about 2 mol % to about 4 mol %). The amount of ZnO may be in the range from about 0 to about 2 mol %. The amount of CaO may be from about 0 mol % to about 2 mol %. In one or more embodiments, the glass composition may include MgO and may be substantially free of CaO and ZnO. In one variant, the glass composition may include any one of CaO or ZnO and may be substantially free of the others of MgO, CaO and ZnO. In one or more specific embodiments, the glass composition may include only two of the alkali earth metal oxides of MgO, CaO and ZnO and may be substantially free of the third of the earth metal oxides.

The total amount, in mol %, of alkali metal oxides $R_2O$ in the glass composition may be in the range from about 5 to about 20, from about 5 to about 18, from about 5 to about 16, from about 5 to about 15, from about 5 to about 14, from about 5 to about 12, from about 5 to about 10, from about 5 to about 8, from about 5 to about 20, from about 6 to about 20, from about 7 to about 20, from about 8 to about 20, from about 9 to about 20, from about 10 to about 20, from about 6 to about 13, or from about 8 to about 12.

In one or more embodiments, the composition of the glass substrate 10 includes $Na_2O$ in an amount in the range from about 0 mol % to about 18 mol %, from about 0 mol % to about 16 mol % or from about 0 mol % to about 14 mol %, from about 0 mol % to about 10 mol %, from about 0 mol % to about 5 mol %, from about 0 mol % to about 2 mol %, from about 0.1 mol % to about 6 mol %, from about 0.1 mol % to about 5 mol %, from about 1 mol % to about 5 mol %, from about 2 mol % to about 5 mol %, or from about 10 mol % to about 20 mol %.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the composition of the glass substrate 10 may include $K_2O$ in an amount less than about 5 mol %, less than about 4 mol %, less than about 3 mol %, less than about 2 mol %, or less than about 1 mol %. In one or more alternative embodiments, the glass composition may be substantially free, as defined herein, of $K_2O$.

In one or more embodiments, the composition of the glass substrate 10 may include $Li_2O$ in an amount about 0 mol % to about 18 mol %, from about 0 mol % to about 15 mol % or from about 0 mol % to about 10 mol %, from about 0 mol % to about 8 mol %, from about 0 mol % to about 6 mol %, from about 0 mol % to about 4 mol % or from about 0 mol % to about 2 mol %. In some embodiments, the glass composition may include $Li_2O$ in an amount about 2 mol % to about 10 mol %, from about 4 mol % to about 10 mol %, from about 6 mol % to about 10 mol %, or from about 5 mol % to about 8 mol %. In one or more alternative embodiments, the glass composition may be substantially free, as defined herein, of $Li_2O$.

In one or more embodiments, the glass composition may include $Fe_2O_3$. In such embodiments, $Fe_2O_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $Fe_2O_3$.

In one or more embodiments, the glass composition may include $ZrO_2$. In such embodiments, $ZrO_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, and all ranges and sub-ranges therebetween. In one or more alternative embodiments, the glass composition may be substantially free, as defined herein, of $ZrO_2$.

In one or more embodiments, the glass composition may include $P_2O_5$ in a range from about 0 mol % to about 10 mol %, from about 0 mol % to about 8 mol %, from about 0 mol % to about 6 mol %, from about 0 mol % to about 4 mol %, from about 0.1 mol % to about 10 mol %, from about 0.1 mol % to about 8 mol %, from about 4 mol % to about 8 mol %, or from about 5 mol % to about 8 mol %. In some instances, the glass composition may be substantially free of $P_2O_5$.

In one or more embodiments, the glass composition may include $TiO_2$. In such embodiments, $TiO_2$ may be present in an amount less than about 6 mol %, less than about 4 mol %, less than about 2 mol %, or less than about 1 mol %. In one or more alternative embodiments, the glass composition may be substantially free, as defined herein, of $TiO_2$. In some embodiments, $TiO_2$ is present in an amount in the range from about 0.1 mol % to about 6 mol %, or from about 0.1 mol % to about 4 mol %. In some embodiments, the glass may be substantially free of $TiO_2$.

In some embodiments, the glass composition may include various compositional relationships. For example, the glass composition may include a ratio of the amount of $Li_2O$ (in mol %) to the total amount of $R_2O$ (in mol %) in the range from about 0.5 to about 1. In some embodiments, the glass composition may include a difference between the total amount of $R_2O$ (in mol %) to the amount of $Al_2O_3$ (in mol %) in the range from about −5 to about 0. In some instances the glass composition may include a difference between the total amount of $R_xO$ (in mol %) and the amount of $Al_2O_3$ in the range from about 0 to about 3. The glass composition of one or more embodiments may exhibit a ratio of the amount of MgO (in mol %) to the total amount of RO (in mol %) in the range from about 0 to about 2.

In some embodiments, the compositions used for the glass substrate 10 may be batched with 0-2 mol % of at least one fining agent selected from a group that includes $Na_2SO_4$, NaCl, NaF, NaBr, $K_2SO_4$, KCl, KF, KBr, and $SnO_2$. The glass composition according to one or more embodiments may further include $SnO_2$ in the range from about 0 to about 2, from about 0 to about 1, from about 0.1 to about 2, from about 0.1 to about 1, or from about 1 to about 2. The glass compositions disclosed herein may be substantially free of $As_2O_3$ and/or $Sb_2O_3$.

In one or more embodiments, the composition may specifically include 62 mol % to 75 mol % $SiO_2$; 10.5 mol % to about 17 mol % $Al_2O_3$; 5 mol % to about 13 mol % $Li_2O$; 0 mol % to about 4 mol % ZnO; 0 mol % to about 8 mol % MgO; 2 mol % to about 5 mol % $TiO_2$; 0 mol % to about 4 mol % $B_2O_3$; 0 mol % to about 5 mol % $Na_2O$; 0 mol % to about 4 mol % $K_2O$; 0 mol % to about 2 mol % $ZrO_2$; 0 mol % to about 7 mol % $P_2O_5$; 0 mol % to about 0.3 mol % $Fe_2O_3$; 0 mol % to about 2 mol % MnOx; and 0.05 mol % to about 0.2 mol % $SnO_2$.

In one or more embodiments, the composition may include 67 mol % to about 74 mol % $SiO_2$; 11 mol % to about 15 mol % $Al_2O_3$; 5.5 mol % to about 9 mol % $Li_2O$; 0.5 mol % to about 2 mol % ZnO; 2 mol % to about 4.5 mol % MgO; 3 mol % to about 4.5 mol % $TiO_2$; 0 mol % to about 2.2 mol % $B_2O_3$; 0 mol % to about 1 mol % $Na_2O$; 0 mol % to about 1 mol % $K_2O$; 0 mol % to about 1 mol % $ZrO_2$; 0 mol % to about 4 mol % $P_2O_5$; 0 mol % to about 0.1 mol % $Fe_2O_3$; 0 mol % to about 1.5 mol % MnOx; and 0.08 mol % to about 0.16 mol % $SnO_2$.

In one or more embodiments, the composition may include 70 mol % to 75 mol % $SiO_2$; 10 mol % to about 15 mol % $Al_2O_3$; 5 mol % to about 13 mol % $Li_2O$; 0 mol % to about 4 mol % ZnO; 0.1 mol % to about 8 mol % MgO; 0 mol % to about 5 mol % $TiO_2$; 0.1 mol % to about 4 mol % $B_2O_3$; 0.1 mol % to about 5 mol % $Na_2O$; 0 mol % to about 4 mol % $K_2O$; 0 mol % to about 2 mol % $ZrO_2$; 0 mol % to about 7 mol % $P_2O_5$; 0 mol % to about 0.3 mol % $Fe_2O_3$; 0 mol % to about 2 mol % MnOx; and 0.05 mol % to about 0.2 mol % $SnO_2$.

In one or more embodiments, the composition may include 52 mol % to about 63 mol % $SiO_2$; 11 mol % to about 15 mol % $Al_2O_3$; 5.5 mol % to about 9 mol % $Li_2O$; 0.5 mol % to about 2 mol % ZnO; 2 mol % to about 4.5 mol % MgO; 3 mol % to about 4.5 mol % $TiO_2$; 0 mol % to about 2.2 mol % $B_2O_3$; 0 mol % to about 1 mol % $Na_2O$; 0 mol % to about 1 mol % $K_2O$; 0 mol % to about 1 mol % $ZrO_2$; 0 mol % to about 4 mol % $P_2O_5$; 0 mol % to about 0.1 mol % $Fe_2O_3$; 0 mol % to about 1.5 mol % MnOx; and 0.08 mol % to about 0.16 mol % $SnO_2$.

In some embodiments, the composition may be substantially free of any one or more of $B_2O_3$, $TiO_2$, $K_2O$ and $ZrO_2$.

In one or more embodiments, the composition may include at least 0.5 mol % $P_2O_5$, $Na_2O$ and, optionally, $Li_2O$, where $Li_2O$ (mol %)/$Na_2O$ (mol %)<1. In addition, these compositions may be substantially free of $B_2O_3$ and $K_2O$. In some embodiments, the composition may include ZnO, MgO, and $SnO_2$.

In some embodiments, the composition may comprise: from about 58 mol % to about 65 mol % $SiO_2$; from about 11 mol % to about 19 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the composition may comprise from about 63 mol % to about 65 mol % $SiO_2$; from about 11 mol % to about 17 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In some embodiments, the composition may include the following compositional relationships $R_2O$ (mol %)/$Al_2O_3$ (mol %)<2, where $R_2O=Li_2O+Na_2O$. In some embodiments, 65 mol %<$SiO_2$ (mol %)+$P_2O_5$ (mol %)<67 mol %. In certain embodiments, $R_2O$ (mol %)+R'O (mol %)−$Al_2O_3$ (mol %)+$P_2O_5$ (mol %)>−3 mol %, where $R_2O=Li_2O+Na_2O$ and R'O is the total amount of divalent metal oxides present in the composition.

According to an embodiment, the composition of the glass substrate 10 can be given by any of the compositions (A, B and C) outlined below in Table 1.

TABLE 1

| Constituent | (mol %) | | |
|---|---|---|---|
| | Composition A | Composition B | Composition C |
| $SiO_2$ | 68.81 | 64.65 | 57.83 |
| $Al_2O_3$ | 10.26 | 13.93 | 16.53 |
| $B_2O_3$ | 0.00 | 5.11 | |
| $P_2O_5$ | | | 6.45 |
| $Na_2O$ | 15.25 | 13.75 | 16.51 |
| $K_2O$ | | 0.00 | |
| MgO | 5.46 | 2.38 | 2.55 |
| CaO | 0.06 | 0.14 | 0.05 |
| $SnO_2$ | 0.17 | 0.08 | 0.05 |

Referring again to FIG. 1, the glass substrate 10 may also have a selected thickness, t. In some embodiments, the substrate has a thickness, t, of from about 0.03 mm to about 2 mm, from about 0.1 mm to about 1 mm, or from about 0.1 mm to about 0.8 mm. In other embodiments, the substrate has a thickness, t, of from about 0.1 mm to about 1.5 mm, from about 0.1 mm to about 1.3 mm, or from about 0.1 mm to about 1.0 mm. In one or more embodiments, the thickness t of the glass substrate 10 may be about 2 mm or less, about 1.5 mm or less, about 1.1 mm or less, or 1 mm or less (e.g., in the range from about 0.03 mm to about 1.5 mm, from about 0.1 mm to about 1.5 mm, from about 0.2 mm to about 1.5 mm, from about 0.3 mm to about 1.5 mm, from about 0.4 mm to about 1.5 mm, in the range from about 0.01 mm to about 1.1 mm, from about 0.1 mm to about 1.1 mm, from about 0.2 mm to about 1.1 mm, from about 0.3 mm to about 1.1 mm, from about 0.4 mm to about 1.1 mm, from about 0.03 mm to about 1.4 mm, from about 0.03 mm to about 1.2 mm, from about 0.03 mm to about 0.1 mm, from about 0.03 mm to about 1 mm, from about 0.03 mm to about 0.9 mm, from about 0.03 mm to about 0.8 mm, from about 0.03 mm to about 0.7 mm, from about 0.03 mm to about 0.6 mm, from about 0.03 mm to about 0.5 mm, from about 0.1 mm to about 0.5 mm, or from about 0.3 mm to about 0.5 mm).

Referring again to FIG. 1, in embodiments of the pre-fractured glass composite 100, the compressive stress region 50 in the glass substrate 10 can extend from one or both of the primary surfaces 12, 14 to a selected depth 52. As such, the compressive stress region 50 can exist in one or more locations within the substrate 10, including in proximity to its edges. As shown in exemplary form in FIG. 1, the compressive stress region 50 extends from each of the primary surfaces 12, 14 to a first selected depth 52 in the substrate 10.

In some implementations of the pre-fractured glass composite 100, the compressive stress region 50 and the selected depth 52 are defined by an ion exchange or a thermal tempering process. As used herein, a "selected depth," (e.g., selected depth 52) "depth of layer" and "DOC" are used interchangeably to define the depth at which the stress in the ion exchange or thermal temper-strengthened glass substrate changes from compressive to tensile. DOC may be measured by a surface stress meter, such as an FSM-6000, or a scattered light polariscope (SCALP) depending on the ion exchange or thermal tempering treatment. Where the stress in the pre-fractured glass composite 100 (or laminates 200a-400 as shown FIGS. 2A-4) is generated by a thermal tempering process or by exchanging potassium ions into the glass substrate 10, a surface stress meter can be used to measure DOC. Where the stress is generated by exchanging sodium ions into the glass article, SCALP can be used to measure DOC. Where the stress in the composite 100 (or laminates 200a-400 as shown FIGS. 2A-4) is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by a surface stress meter. As also used herein, the "maximum compressive stress" is defined as the maximum compressive stress within the compressive stress region 50 in the substrate 10. In some embodiments, the maximum compressive stress (CS) is obtained at or in close proximity to the one or more primary surfaces 12, 14 defining the compressive stress region 50. In other embodiments, the maximum CS is obtained between the one or more primary surfaces 12, 14 and the selected depth 52 of the compressive stress region 50. According to the convention normally used in the art, compression is expressed as a negative (<0) stress and tension is expressed as a positive (>0) stress. Throughout this description, however, CS is expressed as a positive or absolute value—i.e., as recited herein, CS=|CS|. When the surface CS is measured by a surface stress meter such as the FSM-6000, as manufactured by Orihara Industrial Co., Ltd. (Japan), such measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

With regard to a thermally tempered glass substrate 10, the thermal tempering process can be employed to prevent the propagation of existing flaws in the substrate 10. In some embodiments, the selected depth 52 of a compressive stress region 50 of a thermally tempered glass substrate 10 can be up to approximately 21% of the total thickness of the substrate. In some embodiments, glass substrates 10 that include a compressive stress region 50 formed by a thermal tempering process are required to possess at least a certain thickness (e.g., a thickness of about 3 mm or more). This minimum thickness can be necessary to achieve the desired residual stresses through the development of a sufficient thermal gradient between the core of the substrate 10 and its primary surfaces 12, 14.

In some implementations of the pre-fractured glass composite 100, as depicted in exemplary form in FIG. 1, the glass substrate 10 is selected from a chemically strengthened aluminosilicate glass. In other embodiments, the substrate 10 is selected from chemically strengthened aluminosilicate glass having a compressive stress region 50 extending to a first selected depth 52 of greater than 10 μm, with a maximum compressive stress of greater than 150 MPa. In further embodiments, the substrate 10 is selected from a chemically strengthened aluminosilicate glass having a compressive stress region 50 extending to a first selected depth 52 of greater than 25 μm, with a maximum compressive stress of greater than 400 MPa.

As noted earlier, the glass substrate 10 of the pre-fractured glass composite 100 may also include one or more compressive stress regions 50 that extend from one or more of the primary surfaces 12, 14 to a selected depth 52 (or depths). In some aspects, the compressive stress region 50 has a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values up to about 1200 MPa. In addition, the depth of compression (DOC) or first selected depth 52 can be set at 10 μm or greater, 15 μm or greater, 20 μm or greater, 25 μm or greater, 30 μm or greater, 35 μm or greater and to even higher depths depending on the thickness of the substrate 10 and the processing conditions associated with generating the compressive stress region 50. According to some embodiments, the glass substrate 10 of the pre-fractured glass composite 100 depicted in FIG. 1 can exhibit a thickness, t, of less than about 2 mm (e.g., about 1.5 mm or less, about 1 mm or less, or about 0.8 mm or less to about 0.03 mm) a compressive stress region 50 extending from one or more primary surfaces 12, 14 to a selected depth 52 (or DOC) of about 0.1·t or greater.

In embodiments, the CT region 60 is located within the glass substrate 10, at some distance from the primary surfaces 12, 14. As shown in exemplary form in FIG. 1, the CT region 60 is located in a central portion of the substrate, adjacent to the compressive stress region 50 (i.e., which extends from both primary surfaces 12, 14). As also used herein, the "central tension" or "CT" is defined as the greatest magnitude of the central tension (i.e., tensile stress) within the central tension region 60 in the substrate 10. CT values are measured by using a SCALP (e.g., as supplied by Glasstress Ltd., located in Tallinn, Estonia, under model number SCALP-04) and techniques known in the art. The CT values associated with the CT region 60 may be about 25 MPa or greater, about 50 MPa or greater, about 75 MPa or greater, about 85 MPa or greater, about 100 MPa or greater, about 150 MPa or greater, about 200 MPa or greater, about 250 MPa or greater, or about 300 MPa or greater. In some embodiments, the CT values associated with the CT region 60 may be in the range from about 50 MPa to about 400 MPa, (e.g., from about 75 MPa to about 400 MPa, from about 100 MPa to about 400 MPa, from about 150 MPa to about 400 MPa, from about 50 MPa to about 350 MPa, from about 50 MPa to about 300 MPa, from about 50 MPa to about 250 MPa, from about 50 MPa to about 200 MPa, from about 100 MPa to about 400 MPa, from about 100 MPa to about 300 MPa, from about 150 MPa to about 250 MPa). As used herein, CT is the greatest magnitude of the central tension in the glass article.

As noted earlier, the pre-fractured glass composites 100 described herein may be chemically strengthened by an ion exchange process. In this process, ions at or near the surface (e.g., primary surfaces 12, 14) of the glass substrate 10 are replaced by—or exchanged with—larger ions having the same valence or oxidation state. In those embodiments in which the glass substrate 10 comprises an alkali aluminosilicate glass, ions in the surface layer of the glass and the larger ions are monovalent alkali metal cations, such as $Li^+$ (when present in the glass article), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass substrate 10 of the pre-fractured glass composite 100 in a molten salt bath (or two or more molten salt baths) containing the larger ions to be exchanged with the smaller ions in the glass substrate 10. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass substrate 10 (including the structure of the glass substrate 10 and any crystalline phases present) and the desired DOC and CS of the glass substrate 10 that result from the strengthening operation. By way of example, ion exchange of glass substrates 10 may be achieved by immersion of the glass substrates 10 in at least one molten bath containing a salt such as, but not limited to, nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass thickness, bath temperature and glass diffusivity. However, temperatures and immersion times different from those described above may also be used.

In one or more embodiments, the glass substrates 10 of the pre-fractured glass composites 100 may be immersed in a molten salt bath of 100% $NaNO_3$ having a temperature from about 370° C. to about 480° C. In some embodiments, the glass substrate 10 may be immersed in a molten mixed salt bath including from about 5% to about 90% $KNO_3$ and from about 10% to about 95% $NaNO_3$. In some embodiments, the glass substrate 10 may be immersed in a molten mixed salt bath including $Na_2SO_4$ and $NaNO_3$ and have a wider temperature range (e.g., up to about 500° C.). In one or more embodiments, the glass substrate 10 may be immersed in a second bath, after immersion in a first bath. Immersion in a second bath may include immersion in a molten salt bath including 100% $KNO_3$ for 15 minutes to 8 hours.

The ion exchange conditions may be modified based on the glass composition and thickness of the glass substrate 10. For example, a glass substrate 10 having a particular composition and a thickness of 0.4 mm may be immersed in a molten salt bath of 80-100% $KNO_3$ (with the balance $NaNO_3$) having a temperature of about 460° C. for a duration from about 10 hours to about 20 hours. The same substrate having a thickness of about 0.55 mm may be immersed in a molten salt bath of 70-100% $KNO_3$ (with the balance $NaNO_3$) having a temperature of about 460° C. for a duration of from about 20 hours to about 40 hours. The same substrate having a thickness of 0.8 mm may be immersed in a molten salt bath of 60-100% $KNO_3$ (with the balance NaNO$_3$) having a temperature of about 460° C. for a duration of from about 40 hours to about 80 hours. In one or more embodiments, the glass substrate 10 may be immersed in a molten, mixed salt bath including NaNO$_3$ and KNO$_3$ (e.g., 49%/51%, 50%/50%, 51%/49%) having a temperature less than about 420° C. (e.g., about 400° C. or about 380° C.) for less than about 5 hours, or even about 4 hours or less.

Ion exchange conditions can be tailored to provide a "spike" or to increase the slope of the stress profile at or near the surface (e.g., primary surfaces 12, 14) of the resulting glass substrate 10. This spike can be achieved by single bath or multiple baths, with the bath(s) having a single composition or mixed composition, due to the unique properties of the glass compositions used in the glass-based articles described herein.

Referring again to the pre-fractured glass composite 100 depicted in exemplary form in FIG. 1, a plurality of cracks 72 is located within the CT region 60 of the glass substrate 10, which spans a thickness 62. In some embodiments of the glass composite 100, additional cracks besides the plurality of cracks 72 in the CT region 60 can exist in the glass substrate 10 between the CT region 60 and each of the primary surfaces 12, 14. Accordingly, a majority (>50%) of the total cracks in the glass substrate 10 can be classified as the plurality of cracks 72 that are located in the CT region 60 and do not extend to the primary surfaces 12, 14. In some implementations, the glass substrate 10 includes a plurality of cracks 72 that are indicative of a dense fracture pattern with a dicing effect that is analogous to fully, thermally tempered glass used in shower panels or automobile window panels. In some embodiments, the plurality of cracks 72 defines fragments that would be less injurious to humans (e.g., assuming that they separated from the substrate 10 and the second phase 70 comprising a resin within them). For example, in embodiments of glass substrates 10 with a plurality of cracks 72 that define fragments with a "dicing" effect, the "diced" fragments have a small aspect ratio and the fracture generated surface and the as-formed surface form larger angles (i.e., fewer blade-like or knife-like angles), such that the fragments resemble cubes more than splinters.

In some embodiments of the glass substrates 10, the diced fragments formed by the plurality of cracks 72 are limited by a maximum or longest dimension of 2 millimeters (mm) or less in any direction of the major plane of the glass article. In some instances, when fractured or after the glass article fractures to become the pre-fractured glass substrate, the glass substrate 10 includes a plurality of cracks 72 that define a plurality of fragments having an average aspect ratio of about 30 or less, about 20 or less, about 15 or less, about 10 or less, or about 5 or less (e.g., about 4.5 or less, about 4 or less, about 3.5 or less, about 3 or less, about 2.5 or less, about 2 or less). In some embodiments, the average aspect ratio of the plurality of fragments formed by the plurality of cracks 72 is in the range from about 1 to about 2. In some instances, about 90% or greater, or about 80% or greater, of the plurality of fragments defined by the plurality of cracks 72 exhibits the average aspect ratios described herein. Also, in other embodiments, the plurality of cracks 72 comprises an average fragment size that is less than 10× the thickness of the glass substrate 10. In other embodiments, the plurality of cracks 72 comprises an average fragment size that is less than 9×, less than 8×, less than 7×, less than 6×, less than 5×, less than 4×, less than 3×, less than 2×, less than 1.5× or less than 1× the thickness of the glass substrate 10. As used herein, the term "average aspect ratio" associated with the plurality of cracks 72 refers to an average of the ratio of the longest or maximum dimension of a fragment to the shortest or minimum dimension of a sample size of fragments, each fragment defined or otherwise formed by the plurality of cracks 72. The term "dimension" can include a length, width, diagonal, or thickness. Further, as also used herein, the term "average fragment size" associated with the plurality of cracks 72 refers to an average of the longest or maximum dimension of a fragment of a sample size of fragments, each fragment defined or otherwise formed by the plurality of cracks 72

Referring again to the pre-fractured glass composite 100 depicted in exemplary form in FIG. 1, the composite also includes a second phase 70 comprising a polymer or a cured resin that resides within the plurality of cracks 72, typically within voids created by the cracks 72 (e.g., in the space between one or more cracks). Accordingly, the plurality of cracks 72 within the glass substrate 10 that were described earlier in the sense that they form or otherwise define fragments, do not form fragments that are loose or otherwise easily separated from the composite 100. That is, the second phase 70 is located within the plurality of cracks 72 such that any fragments formed by the cracks 72 are held in place by the second phase 70. In some embodiments, a substantial portion of the plurality of cracks 72 is devoid of air pockets and filled with the second phase 70 comprising a polymer or a cured resin.

According to some implementations of the pre-fractured glass composite 100, the second phase 70 includes a cured resin, derived from a curable resin cured through processes understood by those with ordinary skill in the field of this disclosure (e.g., thermal energy, ultraviolet light, etc.). The cured resin can include one or more of a thermosetting polymer, epoxy, polyester resin, and vinyl ester material. In some embodiments, the second phase 70 includes a thermoplastic material. According to another embodiment, the second phase 70 includes a curable resin, such as derived from an Ultra Bond, Inc. windshield repair resin having a viscosity from 20 cps to 2400 cps. In a preferred embodiment, the second phase 70 comprises a curable resin derived from Ultra Bond, Inc. windshield repair resin having a viscosity of 20 cps. Further, the second phase 70 can, in some implementations, include a polymer, e.g., a thermoplastic and/or a thermosetting polymeric material, in addition to or as a substitute for a cured resin.

In some implementations of the pre-fractured glass composite 100, the second phase 70 includes a filled epoxy or an unfilled epoxy. An example of a filled epoxy includes a UV induced-catalytic epoxy from the polymerization product of 70.69 wt % Nanopox C620 colloidal silica sol (40% silica nanoparticles in cycloaliphatic epoxy resin), 23.56 wt % Nanopox C680 (50% wt silica nanoparticles in 3-ethyl-3-hydroxymethyl-oxetane), 3 wt % Coatosil MP-200 epoxy functional silane (adhesion promoter), 2.5 wt % Cyracril UVI-6976 (cationic photoinitiator, including triarylsulfonium hexaflouroantimonate salts in propylene carbonate), 0.25 wt % Tinuvine 292 amine stabilizer (bis(1,2,2,6,6-pentamethyl-4-piperidinyl)-sebacate and 1-(methyl)-8-(1,2,2,6,6-pentamethyl-4-piperidinyl)-sebacate). An example of an unfilled epoxy material includes 48 wt % Synasia S06E cycloaliphatic epoxy, 48 wt % Synasia S-101 (3-ethyl-3-oxetanemethanol), 1 wt % UVI-6976 (cationic photoinitiator), and 3 wt % Silquest A-186 (epoxy functionalized silane).

In some embodiments of the pre-fractured glass composite 100, the second phase 70 is a polymer and/or a cured resin with a composition selected to match the refractive index of the glass substrate 10. According to some embodiments, the polymer and/or the cured resin of the second phase 70 is characterized by a refractive index within about 20%, within about 15%, within about 10%, or within about 5% of the refractive index of the glass substrate 10.

Referring again to FIG. 1, the pre-fractured glass composites 100 are configured for impact resistance. In embodiments, the composite 100 can be characterized by an average impact speed of greater than 400 mm/s prior to failure in a 110° Diamond Dynamic Impact Test (i.e., as judged from a set of testing of at least 10 samples (N≥10)). In other implementations, the composite 100 can be characterized by an average impact speed of greater than 450 mm/s, greater than 500 mm/s, greater than 550 mm/s, greater than 600 mm/s, greater than 650 mm/s, and even greater than 700 mm/s, prior to failure in a 110° Diamond Dynamic Impact Test (i.e., as judged from a set of testing of at least 10 samples (N≥10)).

Referring now to FIG. 2A, a pre-fractured glass laminate 200*a* is depicted that includes a substrate 10 comprising a glass composition. That is, the substrate 10 may include one or more glass materials therein. The substrate 10 also comprises a pair of opposing primary surfaces 12, 14. The substrate 10 further includes a compressive stress region 50, a central tension (CT) region 60 and a plurality of cracks 72. In embodiments, the plurality of cracks 72 is located within the CT region 60, which spans a thickness 62 (see FIG. 1). As also shown in FIG. 2A, the laminate 200*a* further includes a second phase 70 that comprises a cured resin within the plurality of cracks 72. As is also evident from FIG. 2A and the foregoing, the laminate 200*a* comprises a pre-fractured glass composite 100, as depicted in FIG. 1 and outlined earlier in this description. It should be understood that the composite 100 is the same as depicted earlier in FIG. 1 and like-numbered elements have the same or substantially similar structures and functions.

Referring again to FIG. 2A, the pre-fractured glass laminate 200*a* also includes a backing layer 120*a* and an interlayer 110. Further, the interlayer 110 is disposed between one of the primary surfaces 12, 14 of the glass substrate 10 (i.e., of the pre-fractured glass composite 100) and the backing layer 120*a*. As depicted in exemplary form in FIG. 2A, the backing layer 120*a* has a thickness that is substantially equivalent to the thickness of the glass substrate 10.

According to embodiments of the pre-fractured glass laminate 200*a* shown in FIG. 2A, the backing layer 120*a* comprises one or more relatively stiff materials including, but not limited to, a polymer, a tempered glass, an un-tempered glass, a display unit or assembly, etc. In some implementations, the backing layer 120*a* may include a polymer, a glass, a glass-ceramic or a ceramic material. In some embodiments, the backing layer 120*a* may be characterized by an elastic modulus that is at least 5%, at least 10%, at least 15%, at least 20%, at least 25%, or at least 30% greater than an elastic modulus of the interlayer 110. In a preferred embodiment, the backing layer 120*a* of the pre-fractured glass laminate 200*a* has the same or a similar composition as that of the glass substrate 10, but without the plurality of cracks 72 and the second phase 70.

Referring further to FIG. 2A, the interlayer 110 of the pre-fractured glass laminate 200*a* may include the same or a substantially similar composition as the second phase 70, e.g., a cured resin or a polymer. In other implementations, the interlayer 110 may include one or more of a filled epoxy (e.g., as outlined earlier in connection with the second phase 70), an unfilled epoxy (e.g., as outlined earlier in connection with the second phase 70), a filled urethane or an unfilled urethane. In some embodiments of the interlayer 100, it may include a low modulus urethane acrylate. In some embodiments, this material may include silica filling. An example of a low modulus urethane acrylate includes 31.5 wt % Doublemer 554 (aliphatic urethane diacrylate resin), 1.5 wt % Genomer 4188/M22 (monofunctional urethane acrylate), 20 wt % NK Ester A-SA (beta-acryloyl oxyethyl hydrogen succinate), 10 wt % Sartomer SR339 2 (phenoxyethyl acrylate), 4 wt % Irgacure 2022 (photoinitiator, acyl phosphine oxide/alpha hydroxy ketone), 3 wt % adhesion promoter (e.g., Silquest A-189, gamma-mercaptopropyltrimethoxysilane). To form a filled urethane, 4 wt % silica powder (such as Hi Sil 233) may be added.

Referring now to FIG. 2B, a pre-fractured glass laminate 200*b* is depicted that is substantially similar to the pre-fractured glass laminate 200*a* depicted in FIG. 2A. The primary difference is that the pre-fractured glass laminate 200*b* employs a backing layer 120*b* that differs in its thickness relative to the thickness of the glass substrate 10. As such, the pre-fractured glass laminate 200*b* represents an 'asymmetric' configuration in comparison to the configuration of the pre-fractured glass laminate 200*a* shown in FIG. 2A. In all other respects, the laminates 200*a* and 200*b* are equivalent, with like-numbered elements having the same or substantially similar structure and function. In a preferred embodiment, the backing layer 120*b* of the pre-fractured glass laminate 200*b* has the same or a similar composition as that of its glass substrate 10, but without the plurality of cracks 72 and second phase 70.

Referring now to FIG. 3, a pre-fractured glass laminate 300 is depicted that is substantially similar to the pre-fractured glass laminate 200*a* depicted in FIG. 2A. The primary difference is that the pre-fractured glass laminate 300 of FIG. 3 is a two-ply configuration without a backing layer (e.g., backing layer 120*a*), and the pre-fractured glass laminate 200*a* of FIG. 2A is of a single-ply construction. Essentially, the pre-fractured glass laminate 300 is constructed such that the backing layer 120*a* in the laminate 200*a* (see FIG. 2A) is substituted with a second pre-fractured glass composite 100, and the interlayer 110. Accordingly, the pre-fractured glass laminate 300 includes a first glass substrate 10*a* comprising a thickness, a pair of opposed primary surfaces 12*a*, 14*a*, a compressive stress region 50, a central tension (CT) region 60 and a plurality of cracks 70; a second glass substrate 10*b* comprising a thickness, a pair of opposed primary surfaces 12*b*, 14*b*, a compressive stress region 50, a central tension (CT) region 60 and a plurality of cracks 70; a second phase 72 comprising a polymer or a cured resin within the plurality of cracks 70; and an interlayer 110 disposed between the first and second glass substrates 10*a*, 10*b*. As shown in exemplary form in FIG. 3, the compressive stress region 50 extends from each of the primary surfaces 12*a*, 12*b*, 14*a*, 14*b* to a first selected depth 52 (not shown) in the substrates 10*a*, 10*b*. Further, the plurality of cracks 72 is located in the CT region 60 of each of the substrates 10*a*, 10*b*.

Referring again to the pre-fractured glass laminate 300 depicted in FIG. 3, it is configured such that the impact-resistant aspects of the pre-fractured composites 100 are located on each of its major sides. As such, a pre-fractured glass laminate 300 can be employed in applications in which impacts are expected to occur on any of its sides, e.g., as in a passenger window of a vehicle, residential window, etc. Further, according to some implementations of the laminate 300, a multi-ply construction can be employed in which three or more alternating plies of a pre-fractured composite 100 and an interlayer 110 are laminated together into the laminate 300. Such configurations could be used in applications requiring particularly high impact resistance, such as windows in military vehicles in need of ballistic and armor protection.

In a preferred implementation of the pre-fractured glass laminate 300 (see generally FIG. 3), a glass substrate having a composition consistent with Composition A from Table 1 is sandwiched between two glass substrates having a composition consistent with Composition B from Table 1 (along with an interlayer 110 between each of the substrates). Further, the plurality of cracks 72 in each of the substrates of this embodiment defines a plurality of fragments comprising an average aspect ratio of 20 or less, but no less than 4. In this configuration, particularly high impact resistance can be achieved as the fragments are particularly sized to absorb impact energy and facilitate crack deflection within each of the substrates. In addition, a pre-fractured glass laminates 300 with three or more plies can be easier to process without warpage, as the pre-fracturing method (e.g., substrates immersed in a curable resin according to a method as outlined later in the disclosure) can be conducted simultaneously on symmetrically arranged substrates (e.g., a pair of outermost substrates) and allowing for infiltration before such treatments are conducted on the remaining substrates (e.g., the innermost substrate(s)).

Figure 4:
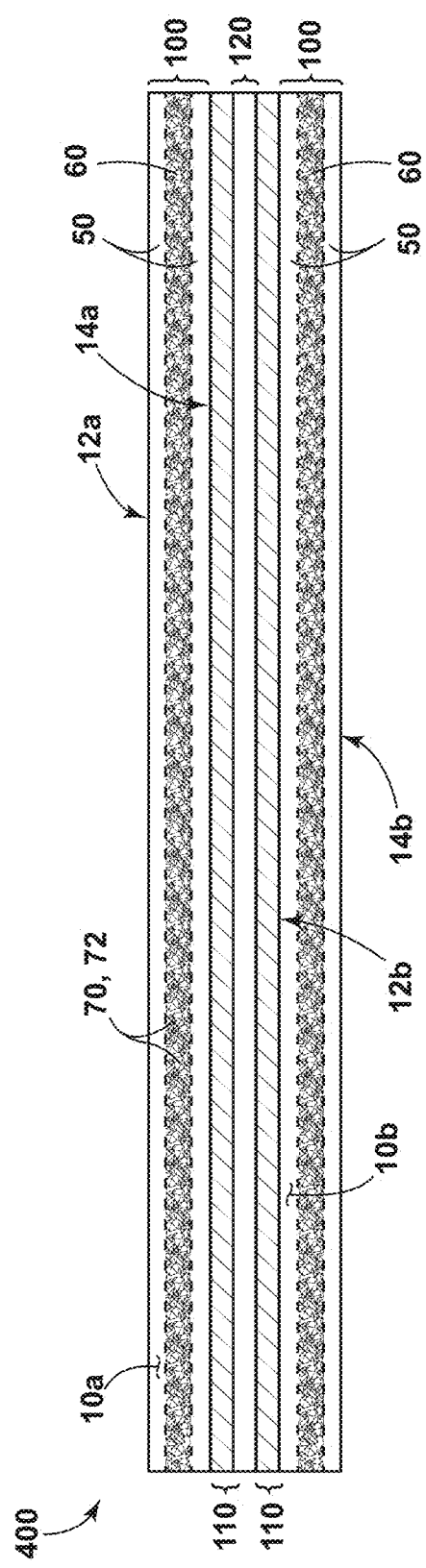
FIG. 4 is a cross-sectional, schematic view of a pre-fractured glass laminate comprising a first and second glass substrate with a plurality of cracks, a second phase comprising a polymer or a cured resin within the plurality of cracks in the substrates, a backing layer and an interlayer between each of the substrates and the backing layer, according to another aspect of the disclosure.

Referring now to FIG. 4, a pre-fractured glass laminate 400 is depicted that is substantially similar to the pre-fractured glass laminate 200a depicted in FIG. 2A. The primary difference is that the pre-fractured glass laminate 400 of FIG. 4 is a two-ply configuration with a backing layer 120 in common between its pre-fractured glass composites 100, and the pre-fractured glass laminate 200a of FIG. 2A is of a single-ply construction with one composite 100 and one backing layer 120a. Accordingly, the pre-fractured glass laminate 400 includes a first glass substrate 10a comprising a thickness, a pair of opposed primary surfaces 12a, 14a, a compressive stress region 50, a central tension (CT) region 60 and a plurality of cracks 70; a second glass substrate 10b comprising a thickness, a pair of opposed primary surfaces 12b, 14b, a compressive stress region 50, a central tension (CT) region 60 and a plurality of cracks 70; a second phase 72 comprising a polymer or a cured resin within the plurality of cracks 70; an interlayer 110 disposed between the first substrate 10a and a backing layer 120; and an interlayer 110 disposed between the second substrate 10b and the backing layer 120. As shown in exemplary form in FIG. 4, the compressive stress region 50 extends from each of the primary surfaces 12a, 12b, 14a, 14b to a first selected depth 52 (not shown) in the substrates 10a, 10b. Further, the plurality of cracks 72 is located in the CT region 60 of each of the substrates 10a, 10b.

Referring again to the pre-fractured glass laminate 400 depicted in FIG. 4, it is configured such that the impact-resistant aspects of the pre-fractured composites 100 are located on each of its major sides. As such, a pre-fractured glass laminate 400 can be employed in applications in which impacts are expected to occur on any of its sides and a backing layer can be incorporated into the assembly, e.g., a double-sided display device employed in a mobile phone, a display device integrated within a passenger window of a vehicle. Further, according to some implementations of the laminate 400, a multi-ply construction can be employed in which three or more alternating plies of a pre-fractured composite 100, an interlayer 110 and a backing layer 120 are laminated together into the laminate 400.

The pre-fractured composites 100 and laminates 200a, 200b, 300, 400 (see FIGS. 1-4) described herein may be incorporated into various products and articles such as in consumer electronics products or devices (e.g., cover glass for mobile electronic devices and touch-enabled displays). These composites and laminates may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), packaging (e.g., pharmaceutical packaging or containers) or any article that requires some fracture and/or impact resistance.

Figure 5A:
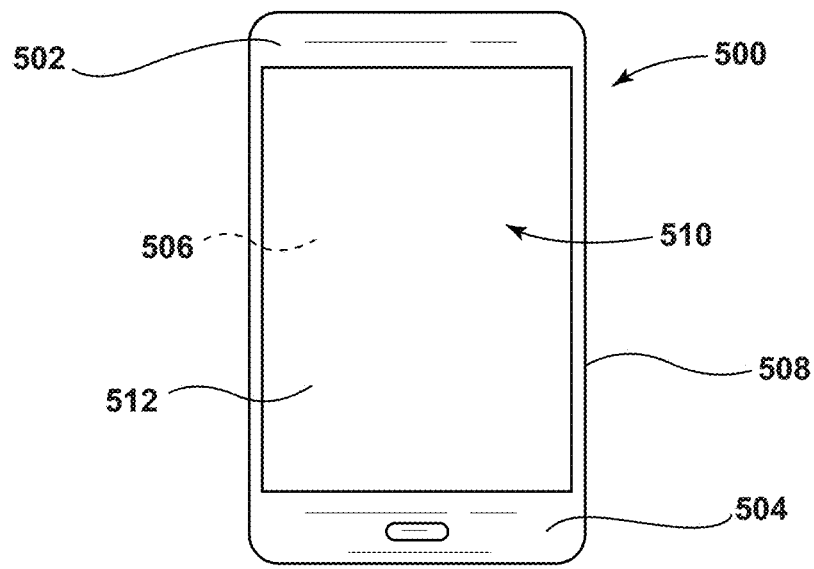
FIG. 5A is a plan view of an exemplary electronic device incorporating any of the composites or laminates disclosed herein.
Figure 5B:
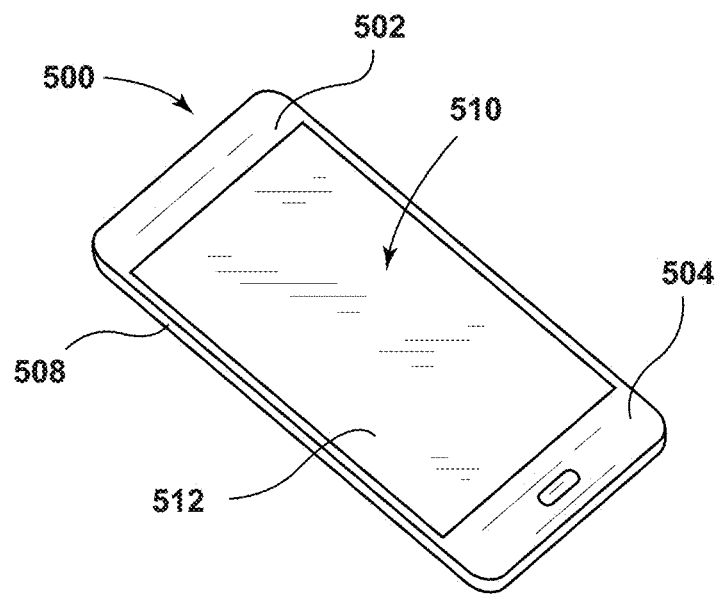
FIG. 5B is a perspective view of the exemplary electronic device of FIG. 5A.

The pre-fractured composites 100 and laminates 200a, 200b, 300, 400 (see FIGS. 1-4) disclosed herein may also be incorporated into a device article such as a device article with a display (or display device articles) (e.g., consumer electronics, including mobile phones, tablets, computers, navigation systems, wearable devices (e.g., watches) and the like), architectural device articles, transportation device articles (e.g., automotive, trains, aircraft, sea craft, etc.), appliance device articles, or any device article that benefits from some transparency, scratch-resistance, abrasion resistance or a combination thereof. An exemplary device article incorporating any of the articles disclosed herein (e.g., as consistent with the composites 100 and laminates 200a-400 depicted in FIGS. 1-4) is shown in FIGS. 5A and 5B. Specifically, FIGS. 5A and 5B show a consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In some embodiments, the cover substrate 512 may include any of the pre-fracture composites or laminates disclosed herein. In some embodiments, at least one of a portion of the housing or the cover glass comprises the pre-fractured composites or laminates disclosed herein.

Figure 6:
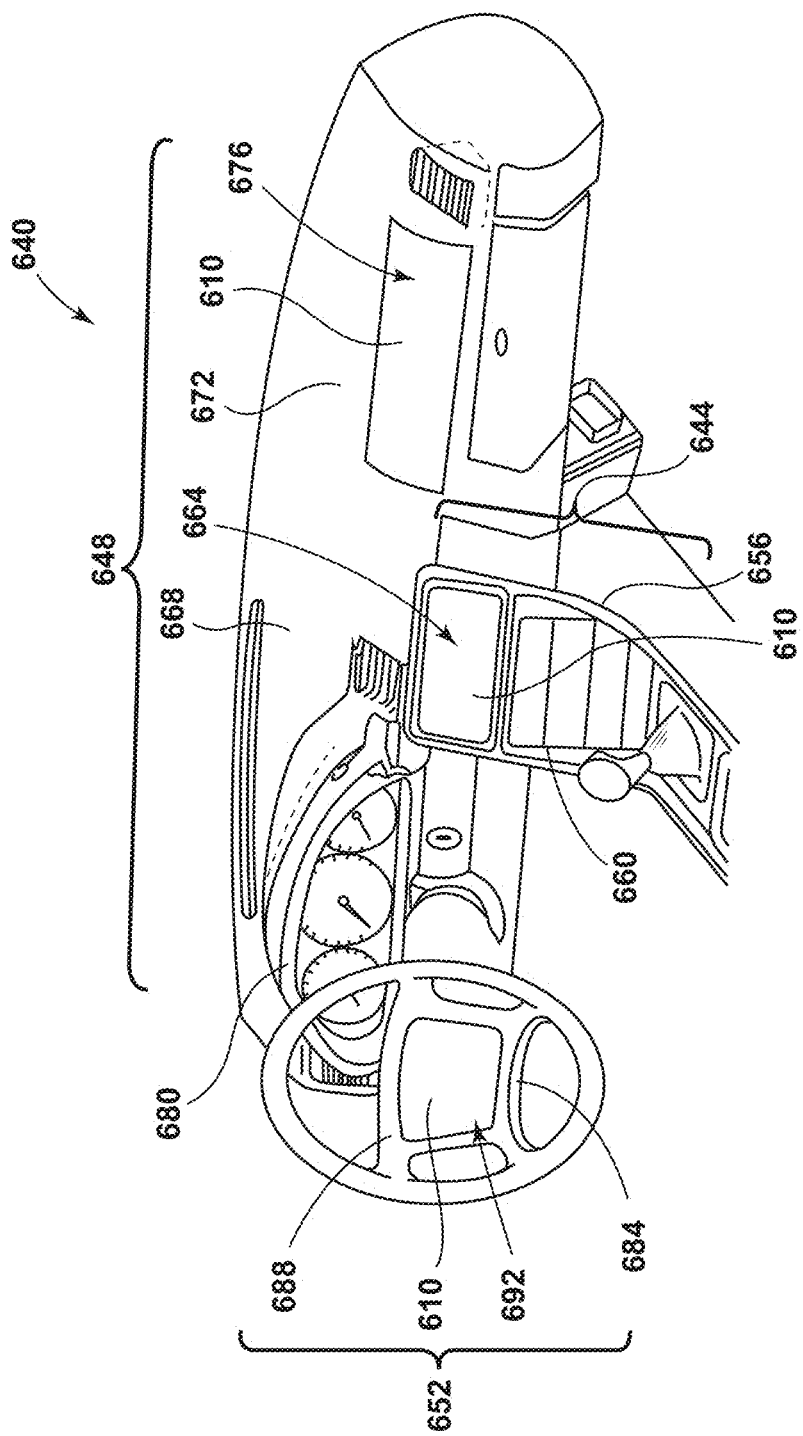
FIG. 6 is a perspective view of a vehicle interior with vehicular interior systems that incorporate any of the composites or laminates disclosed herein.

According to another implementation, the pre-fractured composites 100 and laminates 200a, 200b, 300, 400 may be incorporated within a vehicle interior with vehicular interior systems, as depicted in FIG. 6. More particularly, the composites 100 and laminates 200a-400 (see FIGS. 1-4) may be used in conjunction with a variety of vehicle interior systems. A vehicle interior 640 is depicted that includes three different examples of a vehicle interior system 644, 648, 652. Vehicle interior system 644 includes a center console base 656 with a surface 660 including a display 664. Vehicle interior system 648 includes a dashboard base 668 with a surface 672 including a display 676. The dashboard base 668 typically includes an instrument panel 680 which may also include a display. Vehicle interior system 652 includes a dashboard steering wheel base 684 with a surface 688 and a display 692. In one or more examples, the vehicle interior system may include a base that is an armrest, a pillar, a seat back, a floor board, a headrest, a door panel, or any portion of the interior of a vehicle that includes a surface. It will be understood that the pre-fractured composites 100 and laminates 200a, 200b, 300, 400 described herein can be used interchangeably in each of vehicle interior systems 644, 648 and 652.

Referring again to FIG. 6, the displays 664, 676 and 692 may each include a housing having front, back, and side surfaces. At least one electrical component is at least partially within the housing. A display element is at or adjacent to the front surface of the housings. One of the pre-fractured composites 100 and laminates 200a, 200b, 300, 400 (see FIGS. 1-4) is disposed over the display elements. It will be understood that the pre-fractured composites 100 and laminates 200a, 200b, 300, 400 may also be used on, or in conjunction with, the armrest, the pillar, the seat back, the floor board, the headrest, the door panel, or any portion of the interior of a vehicle that includes a surface as explained above. According to various examples, the displays 664, 676 and 692 may be a vehicle visual display system or vehicle infotainment system. It will be understood that the pre-fractured composites 100 and laminates 200a, 200b, 300, 400 may be incorporated in a variety of displays and structural components of autonomous vehicles and that the description provided herein with relation to conventional vehicles is not limiting.

In an additional implementation of the disclosure, a window panel for a vehicle is provided (not shown) that includes: a frame coupled to the vehicle; and a pre-fractured laminate (e.g., any one of laminates 200a, 200b, 300, 400 as shown in FIGS. 2A-4) or a pre-fractured composite (e.g., a composite 100 as shown in FIG. 1) positioned within or otherwise held by the frame. In an embodiment, the pre-fractured laminate 300 (see FIG. 3) includes a first, second and third glass substrate (e.g., substrates 10a, 10b, etc.), each substrate comprising a thickness, a pair of opposed primary surfaces, a compressive stress region (e.g., compressive stress region 50) a central tension (CT) region (e.g., CT region 60) and a plurality of cracks (e.g., a plurality of cracks 72); a second phase (e.g., a second phase 70) comprising a polymer or a cured resin within the plurality of cracks in the first, second and third glass substrates; a first interlayer (e.g., interlayer 110) disposed between the first and second glass substrates (e.g., substrates 10a, 10b); and a second interlayer (e.g., as comparable to interlayer 110) disposed between the second and third glass substrates (e.g., substrate 10a or 10b and an additional substrate not shown in FIG. 3). Further, the compressive stress region extends from each of the primary surfaces to a first selected depth in the substrate. In addition, the plurality of cracks is located in the CT region of each of the substrates.

In one or more embodiments, any one of the pre-fractured composites 100 and laminates 200a, 200b, 300, 400 (see FIGS. 1-4) may be provided in curved form. The curvature may be imparted by thermal processes or by cold-forming processes. When any one of the pre-fractured composites 100 and/or laminates 200a, 200b, 300, 400 are curved by a cold-forming process, such composite or laminate is curved at a temperature below the glass softening temperature and the curved composite or laminate is retained in the curved shaped by a mechanical mechanism, adhesive or the like.

A feature of a cold-formed composite or laminate is an asymmetric surface compressive between primary surfaces 12, 14. Prior to cold-forming, the respective compressive stresses in the primary surfaces 12, 14 are substantially equal. In one or more embodiments, after cold-forming, the compressive stress on the primary surface having a concave shape after bending increases. In other words, the compressive stress on the concave surface is greater after cold-forming than before cold-forming. Without being bound by theory, the cold-forming process increases the compressive stress of the composite or laminate being shaped to compensate for tensile stresses imparted during bending and/or forming operations. In one or more embodiments, the cold-forming process causes the concave surface to experience compressive stresses, while the surface forming a convex shape after cold-forming experiences tensile stresses. The tensile stress experienced by the convex following cold-forming results in a net decrease in surface compressive stress, such that the compressive stress in convex surface of a composite or laminate following cold-forming is less than the compressive stress on the same surface when the composite or laminate is flat. This asymmetry is manifested a different DOC value measured from one primary surface 12, 14 from the other primary surface.

Figure 9A:
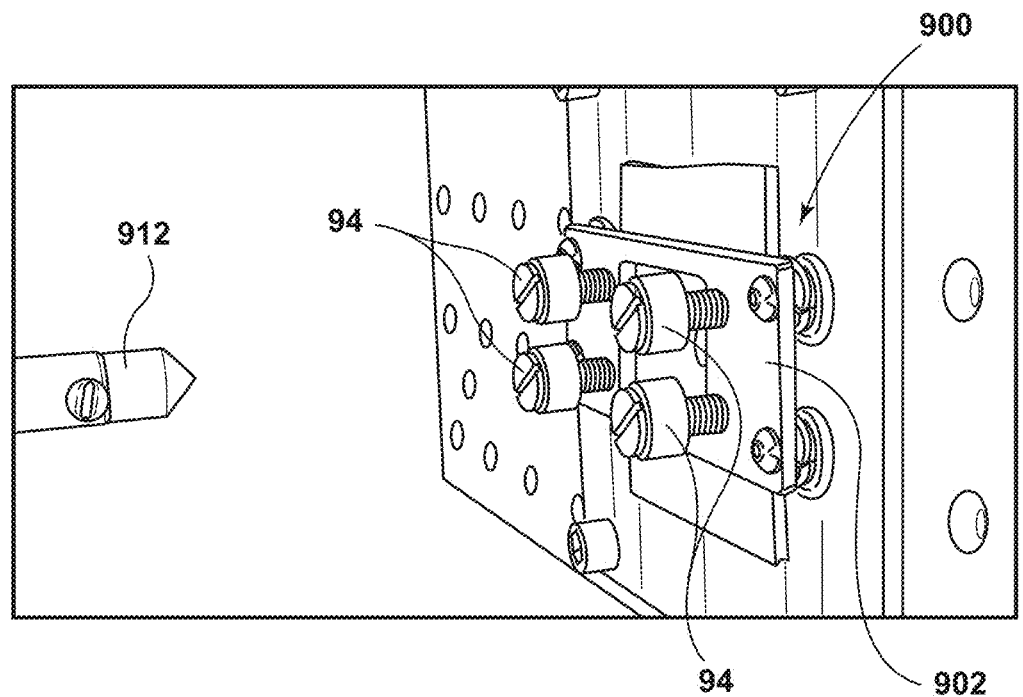
FIG. 9A is a schematic view of a Dynamic Impact Test apparatus, configured to test pre-fractured composites and laminates, according to an embodiment of the disclosure.
Figure 9B:
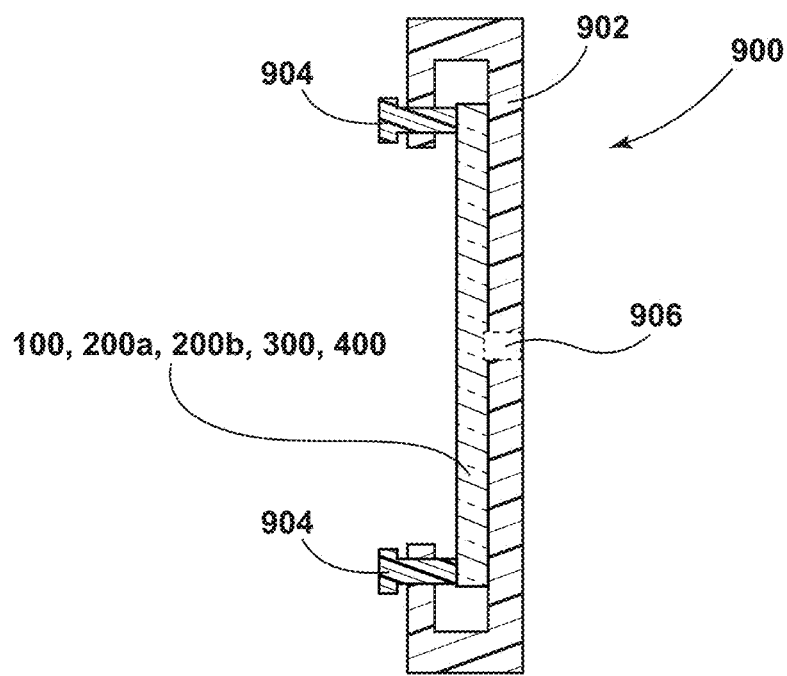
FIG. 9B is a cross-sectional, schematic view of the Dynamic Impact Test apparatus shown in FIG. 9A.

Referring now to FIGS. 9A and 9B, a Dynamic Impact Test apparatus 900 is depicted in schematic form. The apparatus 900 includes a fixture 902 (e.g., fabricated from an aluminum alloy) and four screws 904 (e.g., fabricated from a polymeric material), configured to hold pre-fractured composites and laminates (e.g., composites 100 and laminates 200a, 200b, 300, 400 as shown in FIGS. 1-4) in place during a test. The fixture 902 includes a hole or orifice 906, which functions to hold a high-speed camera or similar device for recording impact events from the back-side of the sample under test. Further, the apparatus 900 includes an indenter 912, typically configured with a diamond tip with a 110 degree pyramidal shape.

As used herein, a "Dynamic Impact Test" is conducted by driving a 110 degree pyramidal shaped indenter into the exposed surface of a pre-fractured composite or laminate (e.g., composites 100 and laminates 200a, 200b, 300, 400 as shown in FIGS. 1-4), as held in place by an apparatus, such as the Dynamic Impact test apparatus 900 depicted in FIGS. 9A and 9B. Further, each impact is conducted such that the indenter is driven into the pre-fractured composite or laminate at a direction that is orthogonal to the surface of the sample. Each sample from a group of samples is subjected to a predetermined impact speed; and each successive sample from the group is tested at an increasing impact speed, until failure is observed in a sample within the group. Accordingly, each sample from a group is only tested one time. These impact speeds range from as a low as 50 mm/s to as high as 700 mm/s. Further, the movement of the indenter during the test is conducted such that it is motor-driven (e.g., by a belt) at a predetermined speed (e.g., from 50 mm/s to 700 mm/s) and then the motor is disengaged from the indenter before impact with the sample. Hence, the indenter travels at the predetermined speed on a virtually frictionless air bearing slide during the impact event. Further, a piezoelectric sensor is affixed behind the indenter to record a loading curve associated with the impact event. The loading curve from each test and data from a high-speed camera (e.g., as mounted in the orifice 906 of the apparatus 900) are analyzed to determine particular glass failure modes for samples within a particular group. Further, the Dynamic Impact Test can also include a fractography analysis of the failed sample(s) to provide further failure mode-related information.

Various methods can be employed to make the pre-fractured composites 100 and laminates 200a, 200b, 300, 400 (see FIGS. 1-4) of the disclosure. According to an embodiment, the method (not shown as depicted in the figures) can include laminating a glass substrate 10 (i.e., as comprising a compressive stress region 50 and a CT region 60) to a backing layer 120 with an interlayer 110. The interlayer 110, as noted earlier, can be a curable resin that is cured through a method commonly understood by those in the field of the disclosure (e.g., through thermal energy, ultraviolet light radiation, etc.).

After the glass substrate 10 is bonded or otherwise adhered to the backing layer 120 by the interlayer 110, it is then submerged into a container or vessel containing curable resin or a polymer (e.g., a melted thermoplastic, a viscous precursor of a thermosetting polymer, etc.). In some embodiments, the curable resin or polymer employed in this step has the same composition as that of the interlayer 120. In other embodiments, the curable resin or polymer employed in this step is of a different composition than that of the interlayer 120.

After the glass substrate 10 is submerged, immersed or otherwise covered with the curable resin and/or polymer, a plurality of cracks 72 is generated in the substrate 10 by a mechanical indentation (e.g., a cut, bend, break or other comparable action to the substrate), preferably at an edge of the substrate 10 or at a portion of one of its primary surfaces 12, 14. Other suitable methods to generate the plurality of cracks 72 include, but are not limited to, thermal shock or the application of laser energy. Upon generation of one or more cracks by such a method, the crack(s) will propagate within the CT region 60 of the substrate 10 to form the plurality of cracks 72. As the glass substrate 10 is submerged within the curable resin and/or polymer, the resin and/or polymer will infiltrate the cracks 72 (and any voids between or within them) and no air bubbles or pockets (or minimal quantities of bubbles and/or pockets) will form within them. Further, the viscosity of the curable resin and/or polymer can be selected to reduce the time necessary for full infiltration of the curable resin into the plurality of cracks 72. After infiltration of the curable resin and/or polymer into the plurality of cracks 72 is completed, the substrate 10 can be removed from the vessel containing the curable resin and/or polymer, and excess resin and polymer can be cleaned from the primary surfaces 12, 14 of the substrate. At this point, the curable resin and/or polymer within the cracks 72 can be cured by any of the approaches suitable for curing the particular resin and/or polymer chosen (e.g., thermal energy, ultraviolet light, etc.) to form the second phase 70 residing within the plurality of cracks 72 in the substrate 10. At this point in the method, a pre-fractured glass composite 100 (see FIG. 1) has been formed and can be employed in the creation and development of laminates 200a, 200b, 300, 400 (see FIGS. 2A-4), and other laminates consistent with these structures, using conventional procedures for laminating layers and materials (e.g., backing layers 120, 120a, 120b; and interlayers 110) to the composite(s) 100.

According to another method of making the pre-fractured glass composites 100 (see FIG. 1) of the disclosure, a pre-fractured glass laminate 200a (see FIG. 2A) is fabricated as noted earlier; however, an interlayer 110 is selected with a composition that differs from the curable resin of the second phase 70 within the plurality of cracks 72 of the glass substrate 10. In some implementations, the composition of the interlayer 110 is selected such that it can be readily dissolved in a medium that will not damage the substrate 10, e.g., an aqueous medium. After the pre-fractured glass laminate 200a has been formed according to the foregoing processes, including lamination with an interlayer 110 and a backing layer 120a, the interlayer 110 is then dissolved in the appropriate medium in which the interlayer 110 is susceptible to dissolution (e.g., an aqueous medium). At this point, the backing layer 120a can then be removed, leaving a pre-fractured glass composite 100 (see FIG. 1).

EXAMPLES

Various non-limiting embodiments of pre-fractured glass composites and laminates according to the disclosure are further clarified by the following examples.

Example 1

Figure 7A:
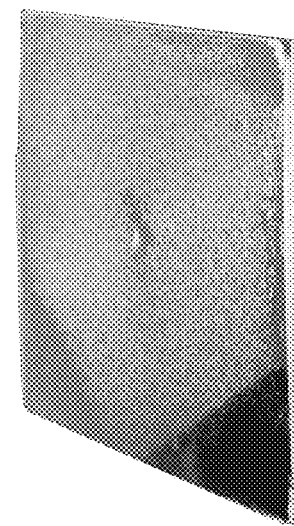
FIGS. 7A-7C are a series of photographs of a pre-fractured laminate comprising a pre-fractured ion-exchanged glass substrate, a resin interlayer, a backing layer of ion-exchanged glass, and progressive amounts of resin in the plurality of cracks within the pre-fractured substrate, according to embodiments of the disclosure.
Figure 7B:
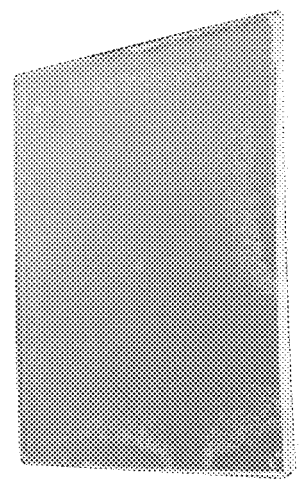
Figure 7C:
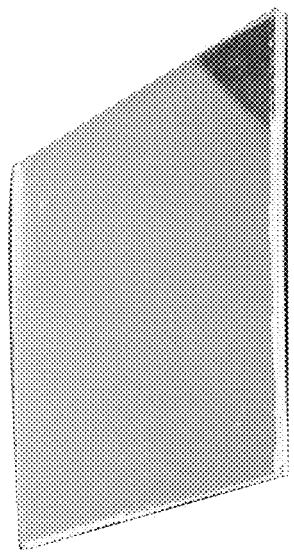
Figure 10:
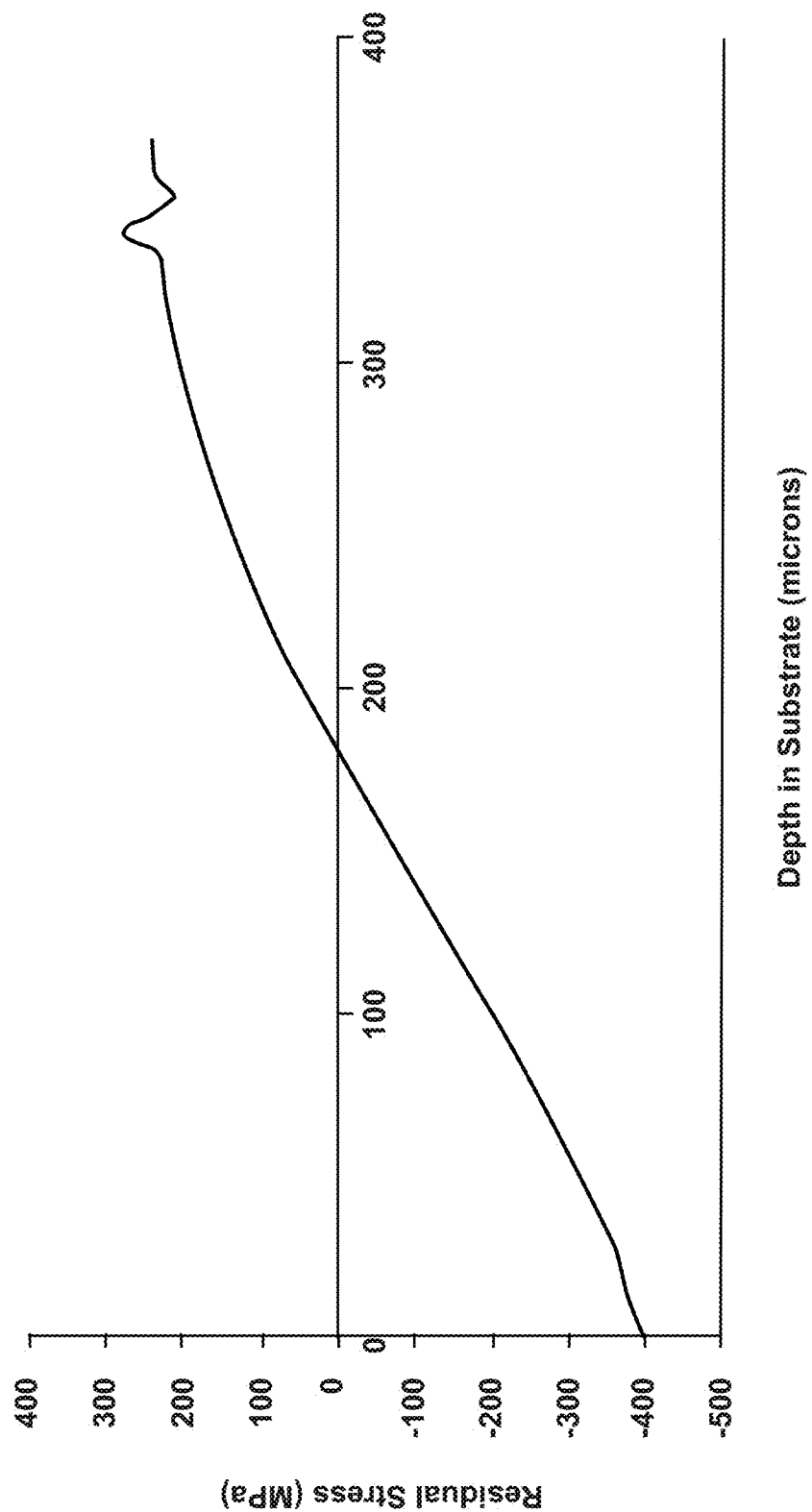
FIG. 10 is a stress profile of ion-exchanged glass, as ion-exchanged in 460° C. 100% $KNO_3$ bath for 60 hours, according to an embodiment of the disclosure.

Referring now to FIGS. 7A-7C, a series of photographs is provided of a pre-fractured laminate comprising five sheets of ion-exchanged glass, a pre-fractured ion-exchanged glass substrate, resin interlayers, and progressive amounts of resin in the pre-fractured glass substrate. Each of the glass substrates within the laminates shown in FIGS. 7A-7C was made by subjecting a Corning® Gorilla® glass substrate (50 mm×50 mm×0.8 mm) to an ion-exchange process involving an immersion of the substrate in a pure $KNO_3$ bath at 460° C. for 60 hours to maximize the CT values within its CT region. The resulting stress state in the substrate is depicted in FIG. 10. Five of such ion-exchanged glass substrates were then bonded together with one drop of UltraBond 20 cps windshield repair resin. The resin was then hardened and cured by exposure to ultraviolet (UV) light at 365 nm for 2 minutes. The hardened resin serves as the interlayer 110 (see FIGS. 1-4). The bonded laminate glass was then immersed in a bath of the same UltraBond 20 cps windshield resin and then a sharp indenter was used to manually fracture one of the ion-exchanged glass substrates to create a plurality of cracks within its CT region. The laminate was left to allow infiltration of the resin into the cracks for at least 24 hours. Upon removal, the laminate was cleaned and then subjected to the same UV light curing for 2 minutes to harden the resin within the cracks. As FIGS. 7A, 7B and 7C are viewed from left to right, they depict the state of the glass at stages of infiltration time up to 24 hours (FIG. 7A=5 minutes; FIG. 7B=1 hour; and FIG. 7C=24 hours) as the cracks were gradually filled with the resin.

Example 2

Figure 8B:
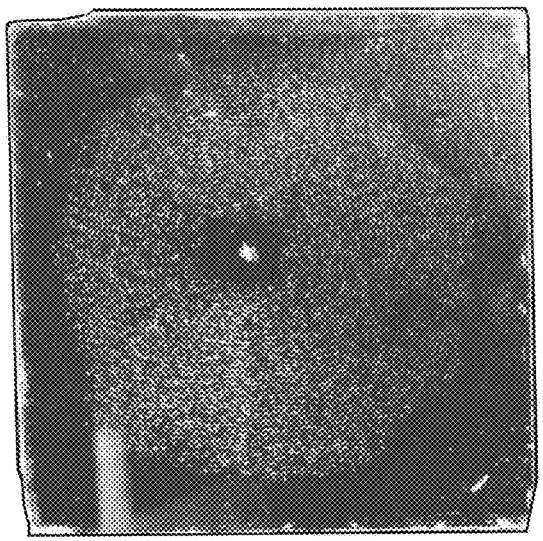
FIGS. 8A-8D are a series of photographs of a laminate comprising two ion-exchanged glass substrates with a resin interlayer as: cracked in air (8A); cracked in air and then infiltrated with resin (8B); cracked while submerged in resin and infiltrated 30 minutes prior to curing (8C); and cracked while submerged in resin and infiltrated for three days prior to curing (8D), according to embodiments of the disclosure.
Figure 8D:
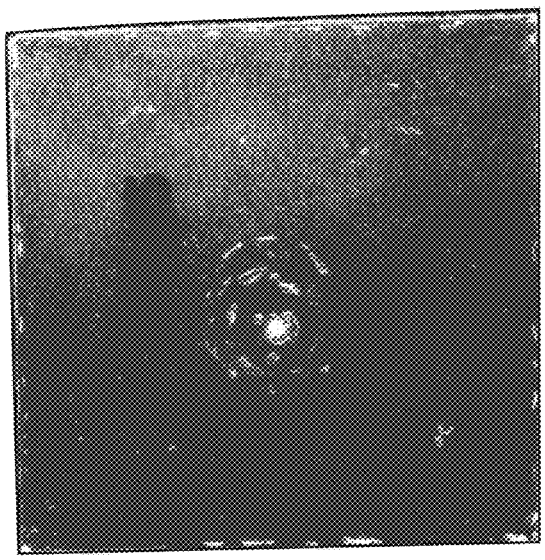
Figure 8A:
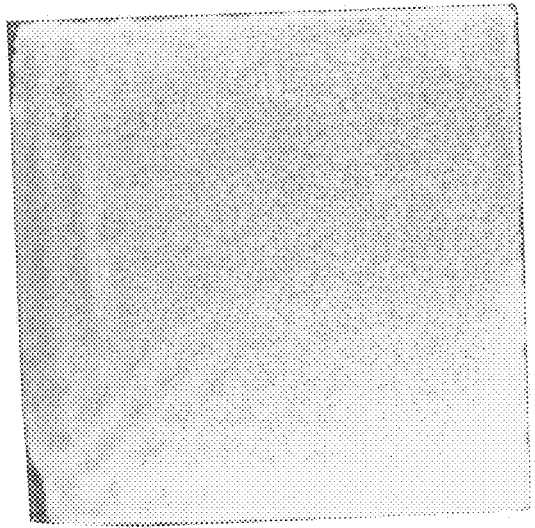
Figure 8C:
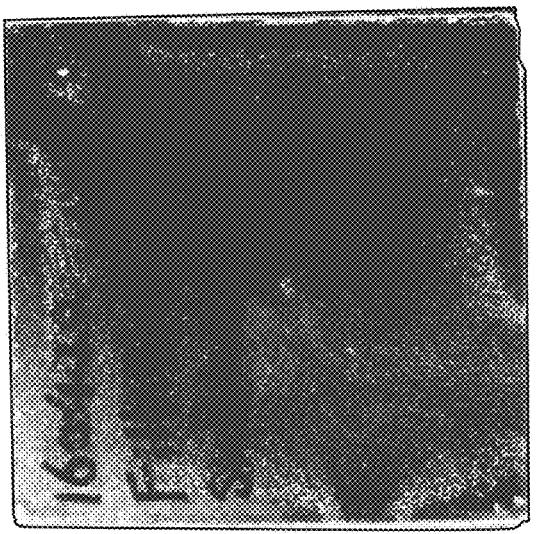

Referring now to FIGS. 8A-8D, photographs of a laminate comprising two ion-exchanged glass substrates with a resin interlayer are provided. Each of the laminates depicted in these photographs was fabricated from two 0.8 mm thick ion-exchanged Corning® Gorilla® glass substrates. The ion-exchange conditions employed to generate a high CT value in the CT region of these substrates include an immersion in a 100% $KNO_3$ molten salt bath at 460° C. for 60 hours to generate a central tension of 295 MPa within each of the substrates. Further, each of these laminates was created by laminating these substrates using a curable resin consistent with those outlined earlier in the disclosure, as cured by an ultraviolet lamp for about 20 minutes. In FIG. 8A, the photograph depicts one of the laminates after having its top substrate shattered in air. In FIG. 8B, the photograph depicts one of the laminates after having its top substrate shattered in air and then immersed in the epoxy resin. As is evident from FIG. 8A, air exists in the cracks upon infiltration of the resin. In FIG. 8C, a laminate was immersed in the same epoxy resin as employed in the sample shown in FIG. 8B. One of the substrates of the immersed laminate was then cracked, and resin was allowed to infiltrate the cracks for 30 minutes before a curing step was completed. The resulting sample is then shown in FIG. 8C, with very little evidence of the cracks as the resin has infiltrated most of the cracks and its refractive index substantially matches the refractive index of the substrate. In FIG. 8D, a laminate sample is depicted as processed in FIG. 8C, except that the resin was allowed to infiltrate the cracks for 3 days before the curing step. The resulting sample is then shown in FIG. 8C, with no visible evidence of the cracks as the resin has infiltrated virtually all of the cracks and its refractive index substantially matches the refractive index of the substrate.

Example 3

Figure 11:
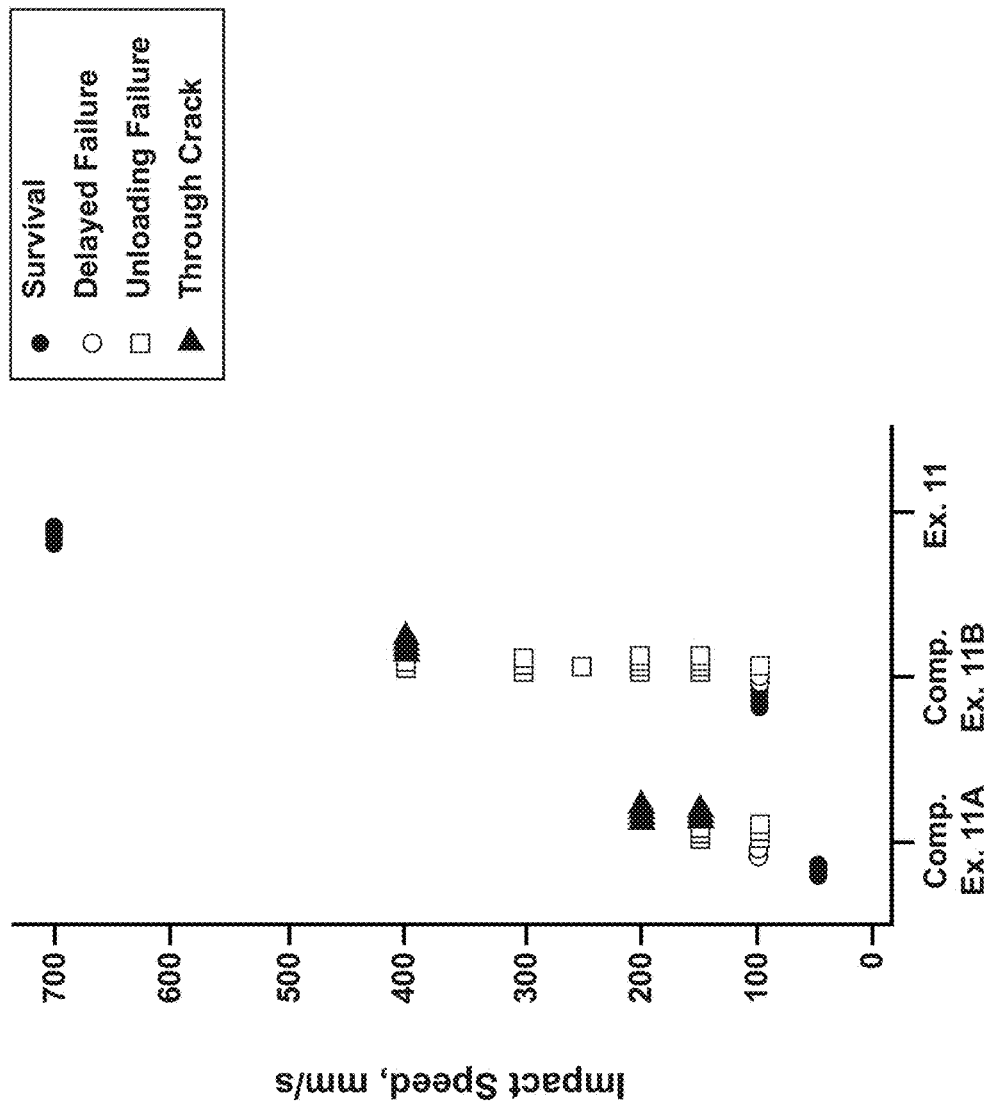
FIG. 11 is a plot of impact speed prior to failure for comparative ion-exchanged glass substrate controls and pre-fractured glass laminates, as tested in a 110° Diamond Dynamic Impact Test, according to aspects of the disclosure.

Referring now to FIG. 11, a plot is provided of impact speed prior to failure for conventional glass substrates and pre-fractured glass laminates, as tested in a 110° Diamond Dynamic Impact Test with a Dynamic Impact Test apparatus, according to aspects of the disclosure. The conventional glass substrates are identified in FIG. 11 as "Comp. Ex. 11A" and "Comp. Ex. 11B," Corning® Gorilla® Glass 3 and 4, respectively. As is evident from the plot, the group of Comp. Ex. 11A samples experience failures at impact speeds of 100 mm/s and greater. As is also evident from the plot, the group of Comp. Ex. 11B samples experience failures at impact speeds of 100 mm/s. In contrast, the pre-fractured glass laminate, "Ex. 11," prepared according to the principles of the disclosure, survived at impact speeds of 700 mm/s.

Example 4

Figure 12:
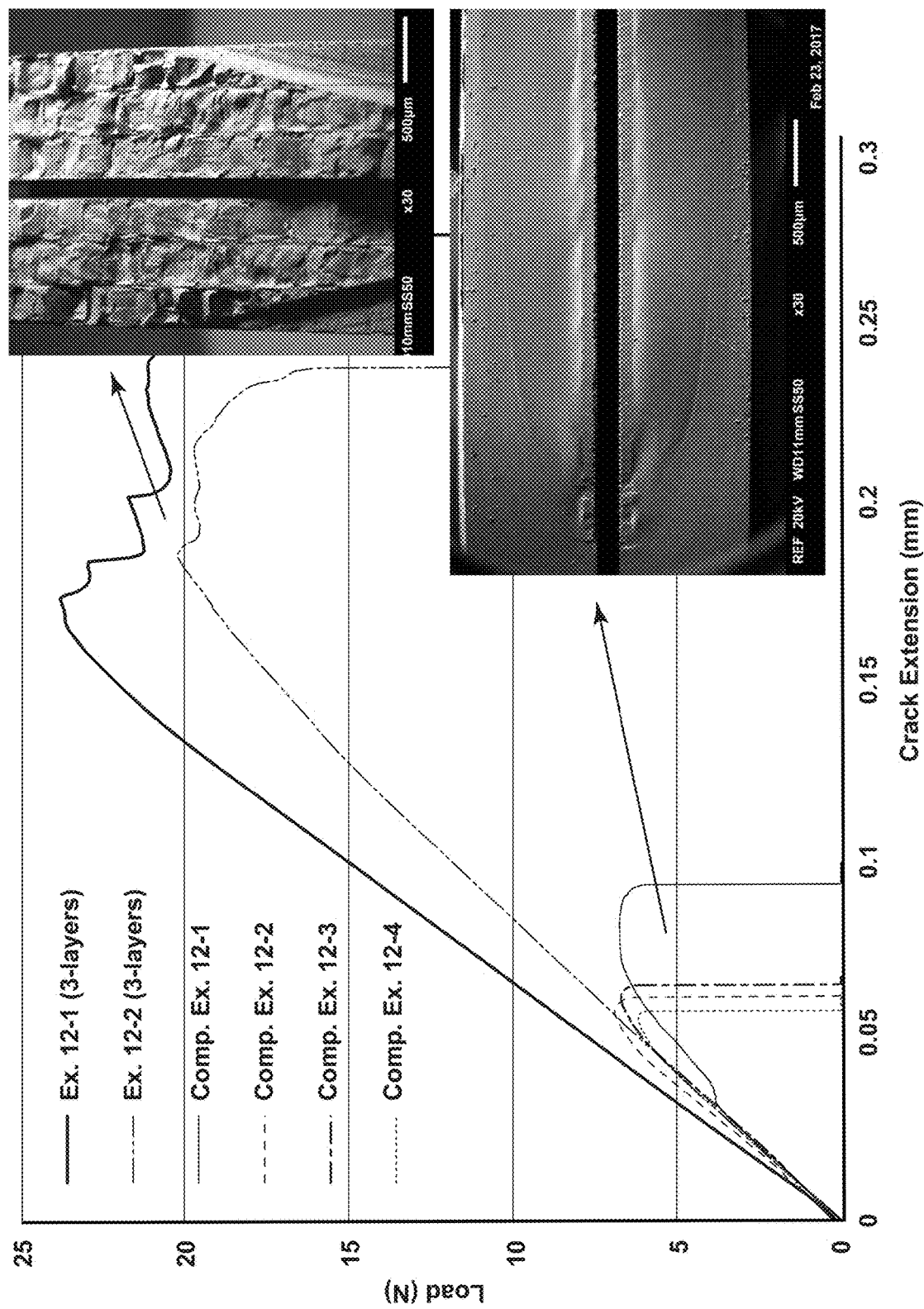
FIG. 12 is a plot of load vs. crack extension for comparative ion-exchanged glass substrate controls and 3-layer pre-fractured glass laminates as tested according to an American Society of Testing Materials (ASTM) double torsion method for determining the fracture toughness of ceramics, according to an aspect of the disclosure.

Referring now to FIG. 12, a plot of load (N) vs. crack extension (mm) for comparative ion-exchanged glass substrate controls ("Comp. Ex. 12-1" to "Comp. Ex. 12-4") and 3-layer pre-fractured glass laminates ("Ex. 12-1" and "Ex. 12-2") as tested according to a Double Torsion Method for determining the fracture toughness of ceramics. As used herein, the "Double Torsion Method" is conducted according to following protocol set forth in "The double-torsion testing technique for determination of fracture toughness and slow crack growth behavior of materials: A review," A. Shyam and E. Lara-Curzio, J. Mater. Sci. 41 (2006) 4093-4104, herby incorporated by reference in its entirety within the disclosure. Further, the glass substrates of the Comp. Ex. 12-1 to Comp. Ex. 12-4 samples were fabricated from Composition C from Table 1, as noted earlier. These samples had a thickness of about 1 mm and a width of 20.03 mm; and were NOT ion-exchanged. Similarly, the glass substrates of the Ex. 12-1 and Ex. 12-2 samples were fabricated from Composition C from Table 1, as noted earlier. Further, these samples, as laminated in three plies, have a total thickness of about 0.99 mm and a width of 20.03 mm; and were ion-exchanged and laminated according to the following conditions, as consistent with those outlined earlier in the disclosure. In particular, each 0.3 mm thick sheet of glass composition C was ion exchanged in 100% $KNO_3$ for 4 hours at 460° C. and cooled to room temperature. The salt was then washed off in water and the samples were laminated together using UltraBond 20 ("UB20") and a UV light to cure the UB20. The outer plies were offset from the middle ply in the lateral direction so that they could be easily fractured using wire cutters or pliers without fracturing the center ply of composition C. The stack was submerged in UB20 and the outer 2 plies were fractured. The UB20 was then allowed to infiltrate the cracks for 48 hrs. The part was removed from the liquid and cured for a few minutes with the UV light. The part was then submerged again in UB20 and the middle ply was then fractured with cutters and allowed to infiltrate. The part was removed from the UB20 and then once again cured with the UV light. As is evident from FIG. 12, the failure loads and crack extensions of the inventive samples (Ex. 12-1 and Ex. 12-2) were about three times higher than the respective failure loads of the comparative samples (Comp. Exs. 12-1 to 12-4). Further, the data from these curves were employed to calculate fracture toughness ($K_{IC}$) values using the Double Torsion Method for the inventive samples (Ex 12-1 and Ex. 12-2) and comparative samples (Comp. Exs. 12-1 to 12-4) of 1.94 MPa√m and 0.62 MPa√m, respectively.

Many variations and modifications may be made to the above-described embodiments of the disclosure without departing substantially from the spirit and various principles of the disclosure. All such modifications and variations are intended to be included herein within the scope of this disclosure and protected by the following claims. For example, the various principles may be combined according to the following embodiments.

Embodiment 1

A pre-fractured glass composite, comprising:
a glass substrate comprising a thickness, a pair of opposed primary surfaces, a compressive stress region, a central tension (CT) region and a plurality of cracks; and
a second phase comprising a polymer or a cured resin within the plurality of cracks,
wherein the compressive stress region extends from each of the primary surfaces to a first selected depth in the substrate, and
further wherein the plurality of cracks is located in the CT region.

Embodiment 2

The composite according to Embodiment 1, wherein a substantial portion of the plurality of cracks is devoid of air pockets.

Embodiment 3

The composite according to Embodiment 1 or Embodiment 2, wherein the polymer or the cured resin is characterized by a refractive index within 10% of a refractive index of the glass substrate.

Embodiment 4

The composite according to any one of any one of Embodiments 1-3, wherein the composite is characterized by an average impact speed of greater than 400 mm/s prior to failure in a 110 Degree Diamond Dynamic Impact Test.

Embodiment 5

The composite according to any one of Embodiments 1-4, wherein the plurality of cracks further comprises an average fragment size that is less than 5× the thickness of the glass substrate.

Embodiment 6

The composite according to any one of Embodiments 1-5, wherein the plurality of cracks defines a plurality of fragments, and further wherein the plurality of fragments comprises an average aspect ratio of 4 or less.

Embodiment 7

The composite according to any one of Embodiments 1-6, wherein the compressive stress region and the first selected depth are defined by an ion exchange or a thermal tempering process.

Embodiment 8

A pre-fractured glass laminate, comprising:
a glass substrate comprising a thickness, a pair of opposed primary surfaces, a compressive stress region, a central tension (CT) region and a plurality of cracks;

a second phase comprising a polymer or a cured resin within the plurality of cracks;

a backing layer; and an interlayer disposed between one of the primary surfaces of the substrate and the backing layer, wherein the compressive stress region extends from each of the primary surfaces to a first selected depth in the substrate, and further wherein the plurality of cracks is located in the CT region.

Embodiment 9

The laminate according to Embodiment 8, wherein the interlayer comprises the polymer or the cured resin.

Embodiment 10

The laminate according to Embodiment 8 or Embodiment 9, wherein the backing layer is characterized by an elastic modulus that is at least 25% greater than an elastic modulus of the interlayer.

Embodiment 11

The laminate according to any one of Embodiments 8-10, wherein the backing layer comprises a polymer, a glass, a glass-ceramic or a ceramic material.

Embodiment 12

The laminate according to any one of Embodiments 8-11, wherein a substantial portion of the plurality of cracks is devoid of air pockets.

Embodiment 13

The laminate according to any one of Embodiments 8-12, wherein the polymer or the cured resin is characterized by a refractive index within 10% of a refractive index of the glass substrate.

Embodiment 14

The laminate according to any one of Embodiments 8-13, wherein the laminate is characterized by an average impact speed of greater than 400 mm/s prior to failure in a 110 Degree Diamond Dynamic Impact Test.

Embodiment 15

The laminate according to any one of Embodiments 8-14, wherein the plurality of cracks further comprises an average fragment size that is less than 5× the thickness of the glass substrate.

Embodiment 16

The laminate according to any one of Embodiments 8-15, wherein the plurality of cracks defines a plurality of fragments, and further wherein the plurality of fragments comprises an average aspect ratio of 4 or less.

Embodiment 17

The laminate according to any one of Embodiments 8-16, wherein the compressive stress region and the first selected depth are defined by an ion exchange or a thermal tempering process.

Embodiment 18

A pre-fractured glass laminate, comprising:

a first glass substrate comprising a thickness, a pair of opposed primary surfaces, a compressive stress region, a central tension (CT) region and a plurality of cracks;

a second glass substrate comprising a thickness, a pair of opposed primary surfaces, a compressive stress region, a central tension (CT) region and a plurality of cracks;

a second phase comprising a polymer or a cured resin within the plurality of cracks in the first and second glass substrates; and an interlayer disposed between the first and second glass substrates, wherein the compressive stress region extends from each of the primary surfaces to a first selected depth in the substrate, and further wherein the plurality of cracks is located in the CT region.

Embodiment 19

The laminate according to Embodiment 18, wherein the interlayer comprises the polymer or the cured resin.

Embodiment 20

The laminate according to Embodiment 18 or Embodiment 19, wherein a substantial portion of the plurality of cracks is devoid of air pockets.

Embodiment 21

The laminate according to any one of Embodiments 18-21, wherein the polymer or the cured resin is characterized by a refractive index within 10% of a refractive index of each of the glass substrates.

Embodiment 22

The laminate according to any one of Embodiments 18-21, wherein the laminate is characterized by an average impact speed of greater than 400 mm/s prior to failure in a 110 Degree Diamond Dynamic Impact Test.

Embodiment 23

The laminate according to any one of Embodiments 18-22, wherein the plurality of cracks defines a plurality of fragments, and further wherein the plurality of fragments comprises an average aspect ratio of 20 or less.

Embodiment 24

The laminate according to any one of Embodiments 18-23, wherein the compressive stress region and the first selected depth are defined by an ion exchange or a thermal tempering process.

Embodiment 25

The laminate according to any one of Embodiments 18-24, further comprising:
a third substrate comprising a thickness, a pair of opposed primary surfaces, a compressive stress region, a central tension (CT) region and a plurality of cracks; and
a second interlayer disposed between the second and third glass substrates,
wherein the second phase further comprises a polymer or a cured resin within the plurality of cracks in the third glass substrate.

Embodiment 26

A consumer electronic product, comprising:
a housing comprising front, back and side surfaces;
electrical components that are at least partially inside the housing; and
a display at or adjacent to the front surface of the housing,
wherein the composite of any one of the Embodiments 1-7 or the laminate of any one of the Embodiments 8-25 is at least one of disposed over the display and disposed as a portion of the housing.

Embodiment 27

A vehicle display system, comprising:
a housing comprising front, back and side surfaces;
electrical components that are at least partially inside the housing; and
a display at or adjacent to the front surface of the housing,
wherein the composite of any one of the Embodiments 1-7 or the laminate of any one of the Embodiments 8-25 is at least one of disposed over the display and disposed as a portion of the housing.

Embodiment 28

A window panel for a vehicle, comprising:
a frame coupled to the vehicle; and
a laminate positioned within the frame, the laminate comprising:
a first, second and third glass substrate, each substrate comprising a thickness; a pair of opposed primary surfaces, a compressive stress region, a central tension (CT) region and a plurality of cracks;
a second phase comprising a polymer or a cured resin within the plurality of cracks in the first, second and third glass substrates;
a first interlayer disposed between the first and second glass substrates; and
a second interlayer disposed between the second and third glass substrates,
wherein the compressive stress region extends from each of the primary surfaces to a first selected depth in the substrate, and
further wherein the plurality of cracks is located in the CT region of each of the substrates.

Embodiment 29

A method of making a pre-fractured glass laminate, comprising:
laminating a glass substrate to a backing layer with an interlayer disposed between the substrate and the backing layer, the glass substrate comprising a thickness, a pair of opposed primary surfaces, a compressive stress region and a central tension (CT) region;
immersing the laminated substrate, backing layer and interlayer into a bath of a curable resin or a polymer;
generating a plurality of cracks within the CT region of the glass substrate;
infiltrating the curable resin or the polymer into the plurality of cracks within the CT region of the glass substrate; and
curing the curable resin or the polymer within the plurality of cracks to form a pre-fractured glass laminate.

Embodiment 30

The method according to Embodiment 29, wherein the compressive stress region in the glass substrate is formed by an ion-exchanging process conducted prior to the laminating step.

What is claimed is:

1. A pre-fractured glass composite, comprising:
a glass substrate comprising a thickness, a pair of opposed primary surfaces, a compressive stress region, a central tension (CT) region, and a plurality of cracks; and
a polymer or a cured resin within the plurality of cracks,
wherein the compressive stress region extends from each of the primary surfaces to a first selected depth in the substrate, the plurality of cracks is located in the CT region, a majority of the plurality of cracks do not extend to the primary surfaces, and the compressive stress region and the first selected depth are defined by an ion exchange or a thermal tempering process.

2. The composite according to claim 1, wherein the plurality of cracks is devoid of air pockets.

3. The composite according to claim 1, wherein the polymer or the cured resin is characterized by a refractive index within 10% of a refractive index of the glass substrate.

4. The composite according to claim 1, wherein the composite is characterized by an average impact speed of greater than 400 mm/s prior to failure in a 110 Degree Diamond Dynamic Impact Test.

5. The composite according to claim 1, wherein the plurality of cracks further comprises an average fragment size that is less than 5× the thickness of the glass substrate.

6. The composite according to claim 1, wherein the plurality of cracks defines a plurality of fragments, and further wherein the plurality of fragments comprises an average aspect ratio of 4 or less.

7. A pre-fractured glass laminate, comprising:
a glass substrate comprising a thickness, a pair of opposed primary surfaces, a compressive stress region, a central tension (CT) region, and a plurality of cracks;
a polymer or a cured resin within the plurality of cracks;
a backing layer; and
an interlayer disposed between one of the primary surfaces of the substrate and the backing layer,
wherein the compressive stress region extends from each of the primary surfaces to a first selected depth in the substrate, the plurality of cracks is located in the CT region, a majority of the plurality of cracks do not extend to the primary surfaces, and the compressive stress region and the first selected depth are defined by an ion exchange or a thermal tempering process.

8. The laminate according to claim 7, wherein the interlayer comprises the polymer or the cured resin.

9. The laminate according to claim 7, wherein the backing layer is characterized by an elastic modulus that is at least 25% greater than an elastic modulus of the interlayer.

10. The laminate according to claim 7, wherein the backing layer comprises a polymer, a glass, a glass-ceramic, or a ceramic material.

11. The laminate according to claim 7, wherein the plurality of cracks is devoid of air pockets.

12. The laminate according to claim 7, wherein the polymer or the cured resin is characterized by a refractive index within 10% of a refractive index of the glass substrate.

13. The laminate according to claim 7, wherein the laminate is characterized by an average impact speed of greater than 400 mm/s prior to failure in a 110 Degree Diamond Dynamic Impact Test.

14. The laminate according to claim 7, wherein the plurality of cracks further comprises an average fragment size that is less than 5× the thickness of the glass substrate.

15. The laminate according to claim 7, wherein the plurality of cracks defines a plurality of fragments, and further wherein the plurality of fragments comprises an average aspect ratio of 4 or less.

16. A pre-fractured glass laminate, comprising:
a first glass substrate comprising a thickness, a pair of opposed primary surfaces, a compressive stress region, a central tension (CT) region, and a plurality of cracks;
a second glass substrate comprising a thickness, a pair of opposed primary surfaces, a compressive stress region, a central tension (CT) region, and a plurality of cracks;
a polymer or a cured resin within the plurality of cracks in the first and second glass substrates; and
an interlayer disposed between the first and second glass substrates,
wherein the compressive stress region extends from each of the primary surfaces to a first selected depth in the substrate, the plurality of cracks is located in the CT region, a majority of the plurality of cracks in the first glass substrate do not extend to the primary surfaces of the first glass substrate, and the compressive stress region and the first selected depth are defined by an ion exchange or a thermal tempering process.

17. The laminate according to claim 16, wherein the interlayer comprises the polymer or the cured resin.

18. The laminate according to claim 16, wherein the plurality of cracks is devoid of air pockets.

19. The laminate according to claim 16, wherein the polymer or the cured resin is characterized by a refractive index within 10% of a refractive index of each of the glass substrates.

20. The laminate according to claim 16, wherein the laminate is characterized by an average impact speed of greater than 400 mm/s prior to failure in a 110 Degree Diamond Dynamic Impact Test.

21. The laminate according to claim 16, wherein the plurality of cracks defines a plurality of fragments, and further wherein the plurality of fragments comprises an average aspect ratio of 20 or less.

22. The laminate according to claim 16, further comprising:
a third substrate comprising a thickness, a pair of opposed primary surfaces, a compressive stress region, a central tension (CT) region, and a plurality of cracks; and
a second interlayer disposed between the second and third glass substrates,
wherein the polymer or the cured resin is further within the plurality of cracks in the third glass substrate.

23. A consumer electronic product, comprising:
a housing comprising front, back, and side surfaces;
electrical components that are at least partially inside the housing; and
a display at or adjacent to the front surface of the housing,
wherein the composite of claim 1 is at least one of disposed over the display and disposed as a portion of the housing.

24. A vehicle display system, comprising:
a housing comprising front, back, and side surfaces;
electrical components that are at least partially inside the housing; and
a display at or adjacent to the front surface of the housing,
wherein the composite of claim 1 is at least one of disposed over the display and disposed as a portion of the housing.

25. A window panel for a vehicle, comprising:
a frame coupled to the vehicle; and
a laminate positioned within the frame, the laminate comprising:
a first, second, and third glass substrate, each substrate comprising a thickness; a pair of opposed primary surfaces, a compressive stress region, a central tension (CT) region, and a plurality of cracks;
a polymer or a cured resin within the plurality of cracks in the first, second, and third glass substrates;
a first interlayer disposed between the first and second glass substrates; and
a second interlayer disposed between the second and third glass substrates,
wherein the compressive stress region extends from each of the primary surfaces to a first selected depth in the substrate, the plurality of cracks is located in the CT region of each of the substrates, a majority of the plurality of cracks in the first glass substrate do not extend to the primary surfaces of the first glass substrate, and the compressive stress region and the first selected depth are defined by an ion exchange or a thermal tempering process.

26. A method of making a pre-fractured glass laminate, comprising:
laminating a glass substrate to a backing layer with an interlayer disposed between the substrate and the backing layer, the glass substrate comprising a thickness, a pair of opposed primary surfaces, a compressive stress region, and a central tension (CT) region;
immersing the laminated substrate, backing layer, and interlayer into a bath of a curable resin or a polymer;
generating a plurality of cracks within the CT region of the glass substrate;
infiltrating the curable resin or the polymer into the plurality of cracks within the CT region of the glass substrate; and
curing the curable resin or the polymer within the plurality of cracks to form a pre-fractured glass laminate, a majority of the plurality of cracks do not extend to the primary surfaces, and the compressive stress region and the first selected depth are defined by an ion exchange or a thermal tempering process.

27. The method according to claim 26, wherein the compressive stress region in the glass substrate is formed by the ion-exchange process conducted prior to the laminating step.

28. The composite according to claim 1, wherein the glass substrate comprises a glass composition comprising:
$SiO_2$ in an amount from 55 wt % to 70 wt %;
$Al_2O_3$ in an amount from 10.5 wt % to 17 wt %;
$B_2O_3$ in an amount from 0 wt % to 6 wt %;
$P_2O_5$ in an amount from 0 wt % to 7 wt %;
$Na_2O$ in an amount from 0 wt % to 18 wt %;
$Li_2O$ in an amount from 0 wt % to 18 wt %;
$K_2O$ in an amount of 5 wt % or less;
MgO in an amount from 0.1 wt % to 8 wt %;
CaO in an amount of 2 wt % or less; and
$SnO_2$ in an amount from 0.05 wt % to 0.2 wt %.

29. The composite according to claim 1, wherein the thickness of the glass substrate is in an range from about 0.03 mm to about 2 mm.

30. The composite according to claim 29, wherein the thickness of the glass substrate is in a range from about 0.03 mm to about 0.7 mm.

* * * * *